(12) United States Patent
Dar et al.

(10) Patent No.: US 9,797,921 B2
(45) Date of Patent: Oct. 24, 2017

(54) COMPENSATION AND CALIBRATION OF MULTIPLE MASS MEMS SENSOR

(71) Applicant: FREESCALE SEMICONDUCTOR, INC., Austin, TX (US)

(72) Inventors: Tehmoor M. Dar, Gilbert, AZ (US); Bruno J. Debeurre, Phoenix, AZ (US); Raimondo P. Sessego, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 125 days.

(21) Appl. No.: 14/844,965

(22) Filed: Sep. 3, 2015

(65) Prior Publication Data
US 2017/0067932 A1   Mar. 9, 2017

(51) Int. Cl.
G01P 21/00        (2006.01)
G01P 15/125       (2006.01)

(52) U.S. Cl.
CPC .................................. *G01P 21/00* (2013.01)

(58) Field of Classification Search
CPC ....................................................... G01P 21/00
See application file for complete search history.

(56) References Cited

U.S. PATENT DOCUMENTS

| | | | |
|---|---|---|---|
| 9,448,266 B2 | 9/2016 | Grosjean et al. | |
| 2002/0083757 A1* | 7/2002 | Geen | G01C 19/5719 73/1.37 |
| 2002/0144548 A1* | 10/2002 | Cohn | G01P 15/125 73/514.16 |
| 2007/0180909 A1* | 8/2007 | Uchiyama | G01C 19/56 73/504.14 |
| 2014/0266246 A1 | 9/2014 | Debeurre et al. | |
| 2015/0027198 A1 | 1/2015 | Sessego et al. | |

FOREIGN PATENT DOCUMENTS

| | | |
|---|---|---|
| EP | 2618163 A1 | 7/2013 |
| EP | 2717060 A1 | 4/2014 |

\* cited by examiner

*Primary Examiner* — Matthew G Marini
*Assistant Examiner* — Ruben Parco, Jr.
(74) *Attorney, Agent, or Firm* — Charlene R. Jacobsen

(57) ABSTRACT

A system includes a MEMS sensor having dual proof masses capable of moving independently from one another in response to forces imposed upon the proof masses. Each proof mass includes an independent set of sense contacts configured to provide output signals corresponding to the physical displacement of the corresponding sense mass. A switch system is in communication with the sense contacts. The switch system is configured to enable a sense mode and various test modes for the MEMS sensor. When the switch system enables a sense mode, output signals from the sense contacts can be combined to produce sense signals. When the switch system enables a test mode, the second contacts are electrically decoupled from one another to disassociate the output signals from one another. The independent sense contacts and switch system enable the concurrent compensation and calibration of the proof masses along two different sense axes.

9 Claims, 11 Drawing Sheets

PRIOR ART

FIG. 5

| SWITCH SYSTEM | | SWITCH OUTPUT | | Z-AXIS MUX | | Z-AXIS MUX OUTPUT | | MODE |
|---|---|---|---|---|---|---|---|---|
| $S_{Z-}$ | $S_{Z+}$ | OUT1 | OUT2 | $S_{M2}$ | $S_{M1}$ | OUT3 | OUT4 | |
| 0 | 0 | 0 | 0 | 0 | 0 | 0 | 0 | N/A |
| 0 | 0 | 0 | 0 | 0 | 1 | $C_{(M1)Z-}$ ↑ 222 | $C_{(M1)Z+}$ ↑ 220 | Z-AXIS M1 TEST 280 |
| 1 | 1 | $C_{2Z-}$ ↑ 258 | $C_{2Z+}$ ↑ 256 | 1 | 1 | $C_{2Z-}$ ↑ 258 | $C_{2Z+}$ ↑ 256 | Z-AXIS SENSE 278 |
| 0 | 0 | 0 | 0 | 1 | 0 | $C_{(M2)Z-}$ ↑ 234 | $C_{(M2)Z+}$ ↑ 232 | Z-AXIS M2 TEST 282 |

| MODE | SW | Y MUX | | | | | | X MUX | | | | | |
|---|---|---|---|---|---|---|---|---|---|---|---|---|---|
| | S<br>A-D | S<br>M1 | S<br>M2 | S<br>M1(AC) | S<br>M1(BD) | S<br>M2(AC) | S<br>M2(BD) | S<br>M1 | S<br>M2 | S<br>M1(AD) | S<br>M1(BC) | S<br>M2(AD) | S<br>M2(BC) |
| N/A | 0 | 0 | 0 | 0 | 0 | 0 | 0 | 0 | 0 | 0 | 0 | 0 | 0 |
| Y-AXIS X-AXIS SENSE 336 | 1 | 1 | 1 | 0 | 0 | 0 | 0 | 0 | 0 | 0 | 0 | 0 | 0 |
| Y-AXIS M1 TEST 338 | 0 | 1 | 0 | 1 | 1 | 0 | 0 | 0 | 0 | 0 | 0 | 0 | 0 |
| Y-AXIS M2 TEST 340 | 0 | 0 | 1 | 0 | 0 | 1 | 1 | 0 | 0 | 0 | 0 | 0 | 0 |
| X-AXIS M1 TEST 342 | 0 | 0 | 0 | 0 | 0 | 0 | 0 | 1 | 0 | 1 | 1 | 0 | 0 |
| X-AXIS M2 TEST 344 | 0 | 0 | 0 | 0 | 0 | 0 | 0 | 0 | 1 | 0 | 0 | 1 | 1 |
| Y-AXIS M1/ X-AXIS M2 TEST 346 | 0 | 1 | 0 | 1 | 1 | 0 | 0 | 0 | 1 | 0 | 0 | 1 | 1 |
| Y-AXIS M2/ X-AXIS M1 TEST 348 | 0 | 0 | 1 | 0 | 0 | 1 | 1 | 1 | 0 | 1 | 1 | 0 | 0 |

| MODE | Y-AXIS MUX | | X-AXIS MUX | |
|---|---|---|---|---|
| | OUT5 | OUT6 | OUT7 | OUT8 |
| Y-AXIS X-AXIS SENSE 336 | $C_{2A}+C_{2C}$ <br> 248  252 | $C_{2B}+C_{2D}$ <br> 250  254 | $C_{2A}+C_{2D}$ <br> 248  254 | $C_{2B}+C_{2C}$ <br> 250  252 |
| Y-AXIS M1 TEST 338 | $C_{(M1)A}+C_{(M1)C}$ <br> 212  216 | $C_{(M1)B}+C_{(M1)D}$ <br> 214  218 | - | - |
| Y-AXIS M2 TEST 340 | $C_{(M2)A}+C_{(M2)C}$ <br> 224  228 | $C_{(M2)B}+C_{(M2)D}$ <br> 226  230 | - | - |
| X-AXIS M1 TEST 342 | - | - | $C_{(M1)A}+C_{(M1)D}$ <br> 212  218 | $C_{(M1)B}+C_{(M1)C}$ <br> 214  216 |
| X-AXIS M2 TEST 344 | - | - | $C_{(M2)A}+C_{(M2)D}$ <br> 224  230 | $C_{(M2)B}+C_{(M2)C}$ <br> 226  228 |
| Y-AXIS M1/ X-AXIS M2 TEST 346 | $C_{(M1)A}+C_{(M1)C}$ <br> 212  216 | $C_{(M1)B}+C_{(M1)D}$ <br> 214  218 | $C_{(M2)A}+C_{(M2)D}$ <br> 224  230 | $C_{(M2)B}+C_{(M2)C}$ <br> 226  228 |
| Y-AXIS M2/ X-AXIS M1 TEST 348 | $C_{(M2)A}+C_{(M2)C}$ <br> 224  228 | $C_{(M2)B}+C_{(M2)D}$ <br> 226  230 | $C_{(M1)A}+C_{(M1)D}$ <br> 212  218 | $C_{(M1)B}+C_{(M1)C}$ <br> 214  216 |

334  312  314  328  330

COMPENSATION AND CALIBRATION OF MULTIPLE MASS MEMS SENSOR

TECHNICAL FIELD OF THE INVENTION

The present invention relates generally to microelectromechanical systems (MEMS) sensors. More specifically, the present invention relates to calibration and compensation of MEMS sensors having multiple movable masses.

BACKGROUND OF THE INVENTION

Microelectromechanical systems (MEMS) sensors are widely used in applications such as automotive electronics, inertial guidance systems, household appliances, consumer electronics, protection systems, and many other industrial, scientific, engineering, and portable systems. Such MEMS sensors are used to sense a physical condition such as, for example, acceleration, pressure, angular rotation, or temperature, and to provide an electrical signal representative of the sensed physical condition to the applications and/or systems employing the MEMS sensors. The applications and/or systems may utilize the information provided by the MEMS sensor to perform calculations, make decisions, and/or take certain actions based on the sensed physical condition.

The electromechanical characteristics of each MEMS sensor can differ due to a variety of factors (e.g., manufacturing tolerances, slight differences in processing depending upon where and when the MEMS sensor was manufactured, and so forth). This means that the electrical output of a MEMS sensor responsive to a certain magnitude of stimulus might differ from the electrical output of a second MEMS sensor responsive to a stimulus of the same magnitude. Because systems employing MEMS sensors may use the electrical output to calculate the extent of the stimulus, and may use the result of that calculation to determine whether to take a certain action, it is important that the electromechanical characteristics of the MEMS sensors be identified and evaluated such that a system employing MEMS sensors can be compensated (for offset) and calibrated (for gain) in order to correlate a given electrical output from the MEMS sensor to a specific amount of applied stimulus.

Typically, the identification and evaluation of electromechanical characteristics of a MEMS sensor system is accomplished by applying an actual mechanical stimulus (for example, an acceleration force) to the MEMS sensor system, measuring the electrical response, and storing values representative of the MEMS electromechanical characteristics in the system, along with trim values representative of any "correction" or calibration factors that need to be applied to the electrical output of the MEMS sensor in light of the MEMS electromechanical characteristics. Application of trim value to the MEMS output can help to ensure that the MEMS sensor output corresponds to the magnitude of the applied stimulus.

Although physically applying various mechanical stimuli to systems employing MEMS sensors can serve to provide calibration data, i.e., trim values, so that the system can function properly, such mechanical testing can be expensive, time-consuming, and potentially damaging to the system being tested. Furthermore, the need to mechanically test a variety of systems and applications employing MEMS sensors can require numerous test stations to be designed and built for each application to be tested, further increasing the cost and time associated with such testing. In addition, although mechanical testing prior to shipment of systems employing MEMS sensors can provide trim values, such testing ignores the fact that over time (and as a result of use or damage), the electromechanical characteristics of the MEMS sensor can change, making the initial calibration trim values no longer appropriate.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

FIG. 5 shows a table of switch logic settings corresponding to the block diagram of FIG. 4;

FIG. 8 shows at table of switch logic settings corresponding to the block diagrams of FIGS. 6 and 7 for enabling sense and test modes of operation;

FIG. 9 shows a table of exemplary outputs in accordance with the sense and test modes of operation;

DETAILED DESCRIPTION

In overview, the present disclosure concerns a system, a microelectromechanical systems (MEMS) sensor, and methodology for testing the MEMS sensor within the system without the need for applying actual mechanical stimuli. Furthermore, calibration and compensation testing can be performed in real time and/or off line using single and multiple electrostatic stimuli on a MEMS sensor having multiple movable masses and multiple sense axes. Still further, efficient switching is enabled for switching between a test mode and a sense mode for the MEMS sensor system. The system and methodology enable the concurrent calibration of two axes of two independently movable elements (e.g., proof masses) of an inertial sensor in order to achieve the objectives of low-cost MEMS sensor testing, recalibration of MEMS sensors throughout the life of the MEMS sensors, and/or testing of MEMS sensor systems without removal of the MEMS sensors from the application.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Much of the inventive functionality and many of the inventive principles are best implemented with or in integrated circuits (ICs) including possibly application specific ICs or ICs with integrated processing or control or other structures. It is expected that one of ordinary skill, notwithstanding possibly significant effort and many design choices motivated by, for example, available time, current technology, and economic considerations, when guided by the concepts and principles disclosed herein will be readily capable of generating such ICs and structures with minimal experimentation. Therefore, in the interest of brevity and minimization of any risk of obscuring the principles and concepts according to the present invention, further discussion of such structures and ICs, if any, will be limited to the essentials with respect to the principles and concepts of the various embodiments.

Figure 1:
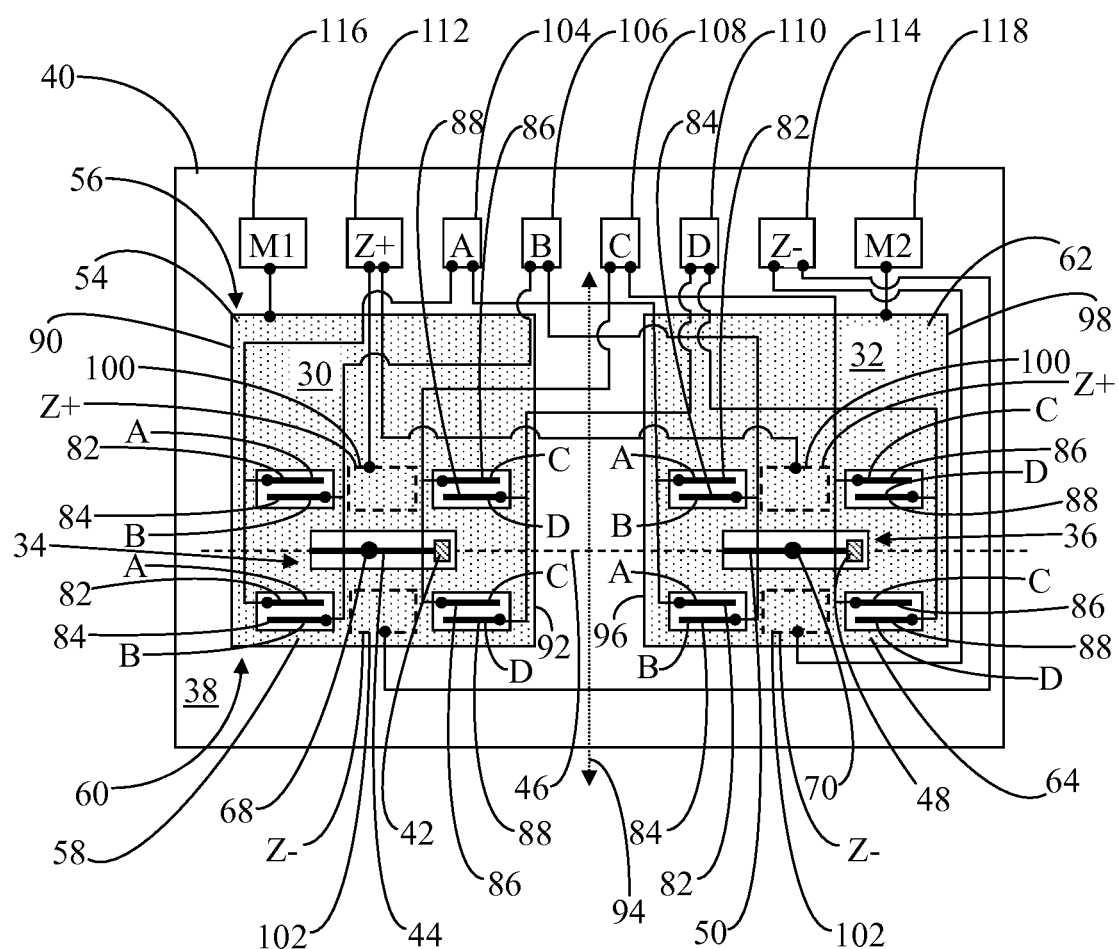
FIG. 1 shows in a simplified and representative form a prior art multiple axis inertial sensor.

Referring to FIG. 1, FIG. 1 shows in a simplified and representative form a prior art multiple axis inertial sensor 20. Inertial sensor 20 is generally configured to sense acceleration forces in three orthogonal directions (e.g., X-direction, Y-direction, Z-direction) defined by three axes, an X-axis 22, a Y-axis 24, and a Z-axis 26 in a three dimensional coordinate system. Accordingly, MEMS inertial sensor 20 is referred to herein as an accelerometer 20. By convention, accelerometer 20 is illustrated as having a generally planar structure within an X-Y plane 28, wherein X-axis 22 is directed rightward and leftward on the page, Y-axis 24 is directed upward and downward on the page, and Z-axis 26 is directed out of the page (normal to X-Y plane 28 in FIG. 1).

Accelerometer 20 generally includes two movable elements, referred to herein as a first proof mass 30 and a second proof mass 32, in which second proof mass 32 is positioned laterally adjacent to first proof mass 30. Accelerometer 20 further includes two suspension spring systems, referred to herein as a first spring system 34 and a second spring system 36. First spring system 34 is configured to movably couple first proof mass 30 to a surface 38 of a substrate 40. Likewise, second spring system 36 is configured to movably couple second proof mass 32 to surface 38 of substrate 40. It should be understood that the terms "first," "second," "third," "fourth," and so on used herein do not refer to a sequential ordering or prioritization of the elements of accelerometer 20. Instead, the terms "first," "second," "third," "fourth," and so on are used to distinguish the various elements from one another for clarity of description.

In an embodiment, first spring system 34 includes a first anchor element 42 and a first spring 44. First anchor element 42 is coupled to substrate 40 at a rotational axis 46 (discussed below) of first proof mass 30, and first spring 44 is interconnected with first anchor element 42 and first proof mass 30. Similarly, second spring system 36 includes a second anchor element 48 and a second spring 50. Second anchor element 48 is coupled to substrate 40 at rotational axis 46, and second spring 50 is interconnected with second anchor element 48 and second proof mass 32.

First and second spring systems 34, 36 facilitate translatory motion of their corresponding first and second proof masses 30, 32 in response to an acceleration force 51, labeled $A_Y$, imposed upon first and second proof masses 30, 32 in a first direction substantially parallel to surface 38 of substrate 40. In the illustrated embodiment, acceleration force 51 is substantially parallel to Y-axis 24. Thus, acceleration force 51 is referred to herein as Y-axis acceleration force 51, and the direction of Y-axis acceleration force 51 is referred to herein as a Y-direction 52. In response to Y-axis acceleration force 51, first and second proof masses 30, 32 will both undergo translatory motion in Y-direction 52. This translatory motion of first and second proof masses 30, 32 is used to detect Y-axis acceleration force 51 in Y-direction 52 substantially parallel to surface 38 of substrate 40.

In an exemplary embodiment, each of first and second proof masses 30, 32 has asymmetric mass relative to rotational axis 46. In the illustrated embodiment, rotational axis 46 is substantially parallel to X-axis 22. That is, first proof mass 30 includes a first portion 54 positioned on a first side 56 of rotational axis 46 and a second portion 58 positioned on a second side 60 of rotational axis 46. Likewise, second proof mass 32 includes a third portion 62 positioned on first side 56 of rotational axis 46 and a fourth portion 64 positioned on second side 60 of rotational axis 46. As such, first and third portions 54, 62 are disposed adjacent to one another at first side 56 and second and fourth portions 58, 64 are disposed adjacent to one another at the opposing second side 60 of rotational axis 46.

First and third portions 54, 62 have greater mass than second and fourth portions 58, 64. This can be accomplished, in some embodiments, by offsetting rotational axis 46 from a geometric center of first and second proof masses 30, 32. Due to the configuration of first and second spring systems 34, 36 and the asymmetric mass, first and second proof masses 30, 32 can undergo in-plane torsion motion (i.e., pivotal motion about Z-axis 26) in response to an acceleration force 65, labeled $A_X$, imposed upon first and second proof masses 30, 32 in a second direction that is also substantially parallel to surface 38 of substrate 40. In the illustrated embodiment, acceleration force 65 is substantially parallel to X-axis 22. Thus, acceleration force 65 is referred to herein as X-axis acceleration force 65, and the direction of the X-axis acceleration force 65 is referred to herein as an X-direction 66. In response to X-axis acceleration force 65, first and second proof masses 30, 32 will both undergo in-plane torsion motion about a pivot axis that is substantially perpendicular to X-Y plane 28, i.e., about Z-axis 26.

In an embodiment, first proof mass 30 will undergo in-plane torsion motion about a first pivot axis, represented by a dot 68 in FIG. 1, in response to X-axis acceleration force 65 in X-direction 66. First pivot axis 68 is generally located at rotational axis 46 and is approximately centered on first proof mass 30 relative to X-axis 22. Likewise, second proof mass 32 will undergo in-plane torsion motion about a second pivot axis, represented by a dot 70 in FIG. 1, in response to X-axis acceleration force 65 in X-direction 66. Second pivot axis 70 is generally located at rotational axis 46 and is approximately centered on second proof mass 32 relative to X-axis 22. The in-plane torsion motion of first and second proof masses 30, 32 is used to detect X-axis acceleration force 65 in X-direction 66 substantially parallel to surface 38 of substrate 40 and perpendicular to Y-direction 52.

Additionally, first and second spring systems 34, 36 further facilitate out-of-plane rotational motion of first and second proof masses 30, 32 about rotational axis 46 in response to an acceleration force 72, labeled $A_Z$, in a direction that is substantially parallel to Z-axis 26. That is, first and second spring systems 34, 36 facilitate teeter-totter like rotation of first and second proof masses 30, 32 about rotational axis 46. The asymmetric mass and rotation about rotational axis 46 enables first and second proof masses 30, 32 to detect Z-axis acceleration force 72 in a third direction, referred to herein as a Z-direction 74 parallel to Z-axis 26 and orthogonal to surface 38 of substrate 40. Z-direction 74 is represented by an encircled dot in FIG. 1. In response to Z-axis acceleration force 72 in Z-direction 74, first and second proof masses 30, 32 will both undergo out-of-plane rotational motion about rotational axis 46. Thus, in the illustrated embodiment, accelerometer 20 is a multi-axis sensing device adapted to detect acceleration forces along three orthogonal axes.

Electrodes 82, 84, 86, 88 are coupled to surface 38 of substrate 40 and can be disposed in openings extending through both of first and second proof masses 30, 32. Electrodes 82, 84, 86, 88 are used for differential signal evaluation in order to sense Y-axis acceleration force 51 in Y-direction 52 and X-axis acceleration force 65 in X-direction 66 as changes in capacitance between electrodes 82, 84, 86, 88 and first and second proof masses 30, 32. Electrodes 82, 84, 86, 88 may be positioned as close to rotational axis 46 as possible (relative to Y-direction 52) in order to minimize the cross coupling of sense signals between rotational motion of first and second proof masses 30, 32 about rotational axis 46 and displacements (translatory motion or in-plane rotary motion) of first and second proof masses 30, 32 resulting from Y-axis acceleration force 51 and/or X-axis acceleration force 65 in either of Y-direction 52 and/or X-direction 66.

The most effective location for detecting in-plane torsion motion is as far away from the pivot axis as possible. The dual proof mass configuration of accelerometer 20 enables placement of electrodes on both sides (relative to X-direction 66) of the two pivot axes 68, 70. Accordingly, for first proof mass 30, electrodes 82, 84 are positioned proximate a first outer edge 90 and electrodes 86, 88 are positioned proximate a first inner edge 92 of first proof mass 30, where first inner edge 92 resides closer to a midline 94 of accelerometer 20 than first outer edge 90. Conversely, for second proof mass 32, electrodes 82, 84 are positioned proximate a second inner edge 96 of second proof mass 32 and electrodes 86, 88 are positioned proximate a second outer edge 98, where second inner edge 96 resides closer to midline 94 of accelerometer 20 than second outer edge 98. The dual proof mass structure of accelerometer 20, with each proof mass 30, 32 pivoting about its respective pivot axis 68, 70 and the inclusion of electrodes 82, 84, 86, 88 at locations of relatively large deformation under in-plane motion yields relatively high changes in capacitances and thereby enhanced sensitivity to acceleration force in X-direction 66 (i.e., X-axis acceleration force 65).

Again, the motion of first and second proof masses 30, 32 is additionally based upon a teeter-totter principal of operation for differential signal evaluation in order to detect Z-axis acceleration force 72 in Z-direction 80 substantially parallel to Z-axis 26. Accordingly, electrodes 100, 102 are formed on surface 38 of substrate 40 underlying each of first and second proof masses 30, 32 on opposing sides of rotational axis 46. Since electrodes 100, 102 are formed on surface 38 of substrate 40, they obscured from view in FIG. 1 by first and second proof masses 30, 32. Electrodes 100, 102 are thus shown in dashed line form. Electrodes 100, 102 are used to detect Z-axis acceleration force 72 in Z-direction 74 as a change in capacitance between electrodes 100, 102 and first and second proof masses 30, 32. Electrodes 100, 102 may be positioned as far away from rotational axis 46 as possible, and are displaced away from rotational axis 46 by an equivalent distance. The displaced position of electrodes 100, 102 results in greater gap width changes as first and second proof masses 30, 32 pivot about rotational axis 46, relative to locations that are closer to rotational axis 46, so as to yield relatively high changes in capacitance and thereby enhanced sensitivity.

Electrodes 82, 84, 86, 88 are collectively represented by a single corresponding electrode 82, 84, 86, 88 in their corresponding quadrants of first and second proof masses 30, 32 for simplicity of illustration. Those skilled in the art will recognize that each quadrant of first and second proof masses 30, 32 can include any suitable quantity and arrangement of electrodes 82, 84, 86, 88. Additionally, electrodes 82 are labeled "A," electrodes 84 are labeled "B," electrodes 86 are labeled "C," and electrodes 88 are labeled "D" in FIG. 1. Similarly, electrodes 100, 102 are labeled "Z+" and electrodes 96 are labeled "Z−" in FIG. 1.

Accelerometer 20 further includes a number of sense contacts. In the illustrated configuration, electrodes 82 associated with both of first and second proof masses 30, 32 are electrically coupled to a sense contact 104, labeled "A" and is referred to herein as "A" sense contact 104. Likewise, electrodes 84 associated with both of first and second proof masses 30, 32 are electrically coupled to a sense contact 106, labeled "B" and is referred to herein as "B" sense contact 106. Electrodes 86 associated with both of first and second proof masses 30, 32 are electrically coupled to a sense contact 108, labeled "C" and is referred to herein as "C" sense contact 108. Electrodes 88 associated with both of first and second proof masses 30, 32 are electrically coupled to a sense contact 110, labeled "D" and is referred to herein as "D" sense contact 110. Additionally, electrodes 100 associated with both of first and second proof masses 30, 32 are electrically coupled to a sense contact 112, labeled "Z+" and is referred to herein as "Z+" sense contact 112. Electrodes 102 associated with both of first and second proof masses 30, 32 are electrically coupled to a sense contact 114, labeled "Z−" and is referred to herein as "Z−" sense contact 114. Still further, a sense contact 116 is electrically coupled to first proof mass 30, labeled "M1" and is referred to herein as "M1" sense contact 116 and a sense contact 118, labeled "M2" and is referred to herein as "M2" sense contact.

For Y-axis acceleration force 51 ($A_Y$), the capacitance change values (C) between electrodes 82, 84, 86, 88 and first and second proof masses 30, 32 can be used in a differential fashion to determine an output signal indicative of a magnitude of Y-axis acceleration force 51, as follows:

$$A_Y = (C_A + C_C) - (C_B + C_D) \tag{1}$$

For X-axis acceleration force 65 ($A_X$), the capacitance change values (C) between electrodes 82, 84, 86, 88 and first and second proof masses 30, 32 can be used in a differential fashion to determine an output signal indicative of a magnitude of X-axis acceleration force 65, as follows:

$$A_X = (C_A + C_D) - (C_B + C_C) \tag{2}$$

For Z-axis acceleration force 72 ($A_Z$), the capacitance change values (C) between electrodes 100, 102 and first and second proof masses 30, 32 can be used in a differential fashion to determine an output signal indicative of a magnitude of Z-axis acceleration force 72, as follows:

$$A_Z = (C_{Z+} - C_{Z-}) \tag{3}$$

In a multiple sense axis accelerometer, performing calibration and compensation testing without physically applying a mechanical stimulus to the MEMS sensor may serve to decrease MEMS sensor calibration complexity and duration, enable recalibration throughout the life of the MEMS sensor, and/or may enable calibration of the MEMS sensor without removal of the MEMS sensor from the application. Unfortunately, however, a conventional differential architecture dual proof mass configuration, such as accelerometer 20, having electrically coupled sense contacts does not support the concurrent calibration of each of the proof masses along different sense axes. Embodiments described herein provide structure and methodology for performing calibration and compensation testing concurrently for two axes of a multiple axis, differential architecture dual proof mass configuration.

Figure 2:
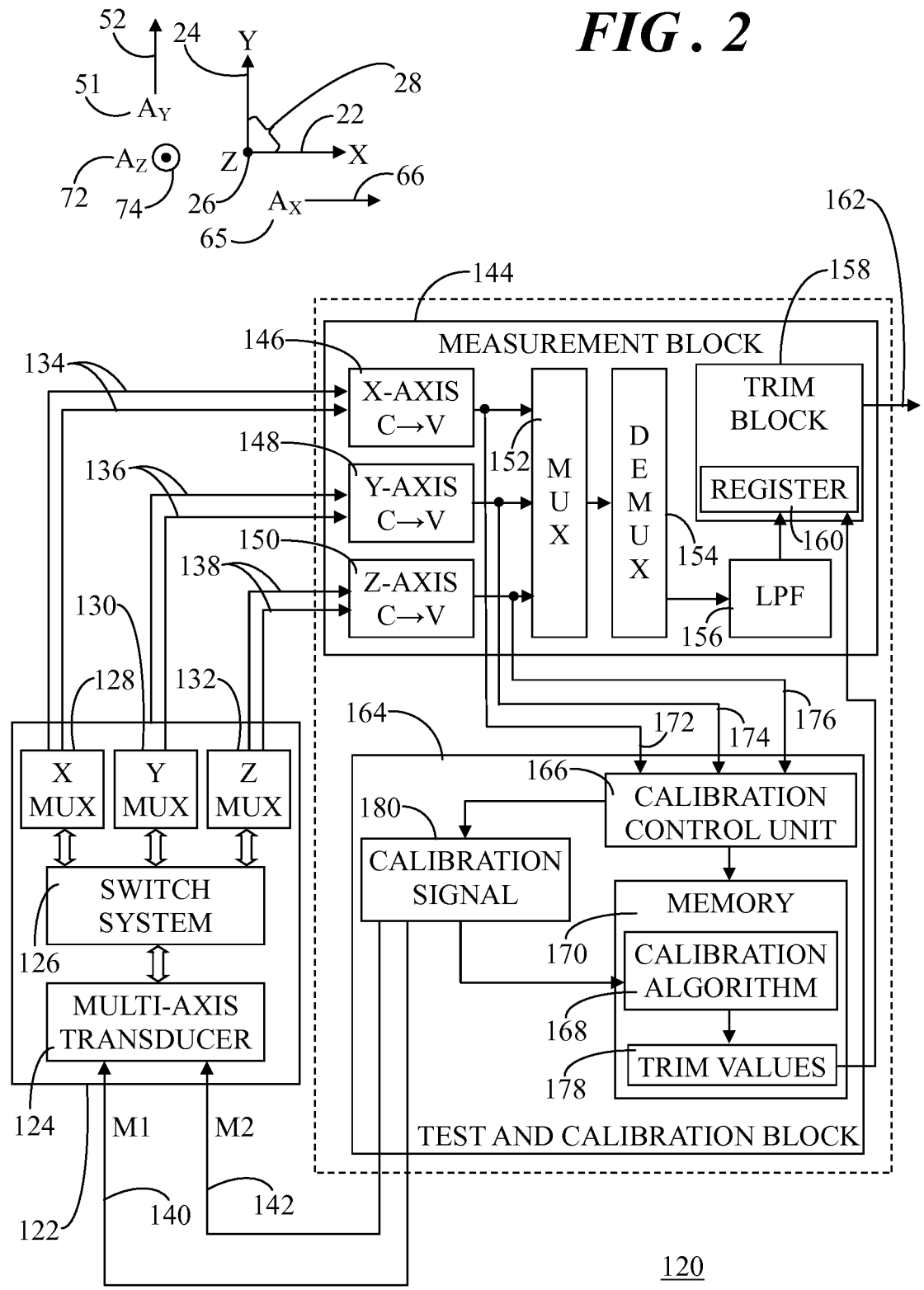
FIG. 2 shows a block diagram of a system in which an inertial sensor may be incorporated in accordance with an embodiment.

Referring now to FIG. 2, FIG. 2 shows a block diagram of a system 120 in which an inertial sensor 122 may be incorporated in accordance with an embodiment. Inertial sensor 122 may be a microelectromechanical systems (MEMS) sensor, such as an accelerometer, configured to respond to a stimulus, such as acceleration force by providing sense signals corresponding to the stimulus. As such, inertial sensor 122 will be referred to herein as MEMS sensor 122. In a particular embodiment, MEMS sensor 122 is a multi-axis sensor. That is, MEMS sensor 122 is configured to sense forces along at least two orthogonal axes and produce sense signals corresponding to the sensed forces.

In an embodiment, MEMS sensor 122 provides output signals corresponding to movement of movable elements, i.e., proof masses (not shown), in response to acceleration or deceleration of MEMS sensor 122 or a device in which MEMS sensor 122 is present. In alternative embodiments, MEMS sensor 122 may be configured as, for example, an inertial sensor, gyroscope, or any other MEMS device configured to provide an output signal in response to a physical stimulus. It should be appreciated that each MEMS sensor may have a number of characteristics unique to each individual MEMS sensor, such as, for example, a resonant frequency, damping characteristics, displacement characteristics, spring constant characteristics, thickness, space between features, and other response characteristics. It should also be appreciated that these unique characteristics may change over time, and/or in response to physical forces applied to the MEMS sensor or environmental conditions such as temperature.

System 120 can be configured to provide sensor-related information from MEMS sensor 122 to other elements of system 120, perform calculations and make decisions based on the sensor-related information, communicate the results of the calculations and decisions to other components, and to cause other components of system 120 to perform actions based on the results of the calculations and decisions.

MEMS sensor 122 generally includes a multi-axis transducer structure 124 and a switch system 126 electrically coupled to multi-axis transducer structure 124. MEMS sensor 122 further includes an X-axis dual output multiplexer switch 128, a Y-axis dual output multiplexer switch 130, and a Z-axis dual output multiplexer switch 132, each of which is in communication with switch system 126. As will be discussed in significantly greater detail below, multi-axis transducer structure 124 is a dual proof mass configuration in which each proof mass may be excited via a separate electrostatic stimulus, and for which trim values specific to each proof mass may be ascertained. Switch system 126 enables switching between a sense mode and various test modes of operation. X-axis multiplexer switch 128 provides one or more X-axis output signals 134 indicative of X-axis acceleration force 65. Y-axis multiplexer switch 130 provides one or more Y-axis output signals 136 indicative of Y-axis acceleration force 51. And Z-axis multiplexer switch 132 provides one or more Z-axis output signals 138 indicative of Z-axis acceleration force 72.

In a test mode discussed below, MEMS sensor 122 is configured to receive a first stimulus signal 140 and a second stimulus signal 142. Stimulus signals 140, 142 are input to MEMS sensor 122 to provide an electrostatic stimulus for the purpose of calibration and compensation of the dual proof masses of MEMS sensor 122. When first and second stimulus signals 140, 142 are provided to separate inputs of MEMS sensor 122, first stimulus signal 140 causes physical displacement of one of the two proof masses of multi-axis transducer 124 and second stimulus signal 142 causes physical displacement of the other one of the two proof masses of multi-axis transducer 124. Each of the two proof masses displaces or moves (responsive to their respective stimulus signals 140, 142) an amount corresponding to the magnitude of stimulus signals 140, 142. One or more of output signals 134, 136, 138 corresponds to the physical displacement of the proof masses.

System 120 further includes a measurement block 144 electrically coupled to MEMS sensor 122. In general, measurement block 144 is configured to receive X-axis output signal 134, Y-axis output signal 136, and Z-axis output signal 138. Measurement block 144 processes signals 134, 136, 138 to convert them to a form useable by devices external to measurement block 144, such as for example, a test and calibration block 164.

In the embodiment generally illustrated in FIG. 2, measurement block 144 includes X-axis capacitance-to-voltage (C-to-V) circuitry, referred to herein as an X-axis C-to-V 146. X-axis C-to-V 146 is configured to receive X-axis output signal 134 (capacitance) from MEMS sensor 122 and convert it to a voltage output. Likewise, measurement block 144 includes Y-axis C-to-V circuitry, referred to herein as a Y-axis C-to-V 148. Y-axis C-to-V 148 is configured to receive Y-axis output signal 136 (capacitance) from MEMS sensor 122 and convert it to a voltage output. Measurement block 144 further includes Z-axis C-to-V circuitry, referred to herein as a Z-axis C-to-V 150. Z-axis C-to-V 150 is configured to receive Z-axis output signal 138 (capacitance) from MEMS sensor 122 and convert it to a voltage output.

The voltage outputs of X-axis C-to-V 146, Y-axis C-to-V 148, and Z-axis C-to-V 150 may be communicated to a multiplexer switch 152 followed by a demultiplexer switch 154 and followed by a low pass filter 156. Low pass filter 156 is shown electrically coupled to a trim block 158. Low pass filter 156 may be configured to filter the output voltages received from X-axis C-to-V 146, Y-axis C-to-V 148, and Z-axis C-to-V 150 to remove noise and provide the filtered output voltages to trim block 158. Trim block 158 is shown having a register 160. Register 160 is configured to store calibration values (also referred to as trim values) used in monitoring, evaluating, calibrating, and operating MEMS sensor 122. In an embodiment, the calibration/trim values are constants that are used by system 120 to more directly correlate the outputs of MEMS sensor 122 with the actual physical displacement of the movable mechanical elements of MEMS sensor 122 in order to produce a calibrated signal output 162.

In accordance with an embodiment, the voltage outputs of X-axis C-to-V 146, Y-axis C-to-V 148, and Z-axis C-to-V 150 may be communicated to test and calibration block 164. Test and calibration block 164 is implemented herein in order to enable calibration and compensation of output signals from MEMS sensor 122 without applying actual mechanical stimuli. Test and calibration block 164 includes a calibration control unit 166 that is configured to execute a calibration algorithm 168 stored in a memory element 170 of test and calibration block 164. Test and calibration block 164 as well as measurement block 144, may reside on any processor, for example, a tester, microchip, or some external microcontroller unit or field-programmable gate array.

Calibration control unit 166, executing calibration algorithm 168, is configured to receive voltage output signals 172, 174, 176 from X-axis C-to-V 146, Y-axis C-to-V 148, and Z-axis C-to-V 150 and determine calibration/trim values 178. Trim values 178 are communicated to and stored in registers 160 of trim block 158. Calibration control unit 166 is further configured to generate one or more calibration signals 180 (type, length, shape, and so forth). The one or more calibration signals 180 will be communicated to MEMS sensor 122 as first stimulus signal 140 and second stimulus signal 142, as discussed below.

Figure 3:
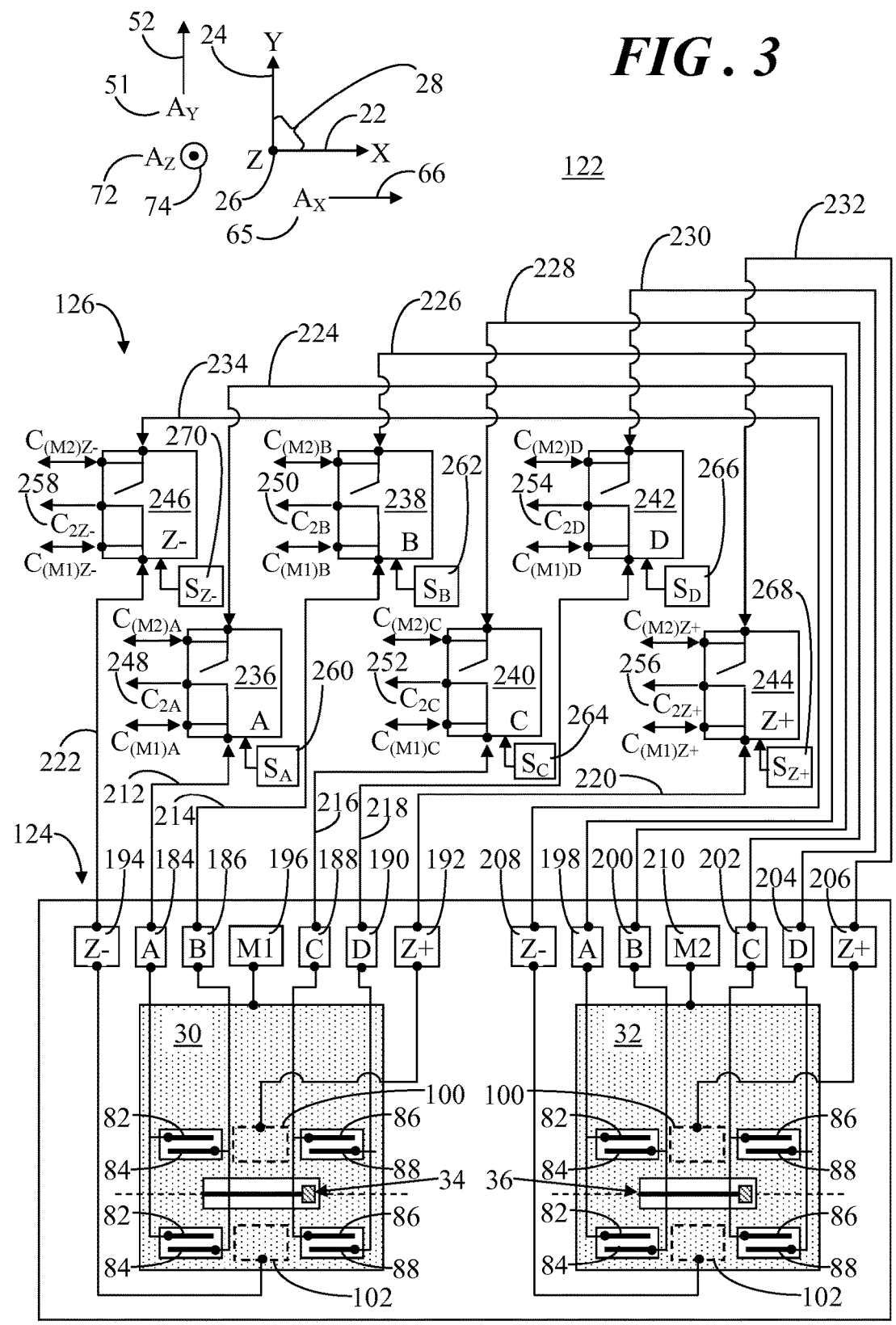
FIG. 3 shows in a simplified and representative the inertial sensor of the system of FIG. 2.

FIG. 3 shows in a simplified and representative form MEMS sensor 122. FIG. 3 includes details pertaining to multi-axis transducer 124 and switch system 126, but does not include X-axis, Y-axis, and Z-axis dual output multiplexer switches 128, 130, 132 for simplicity of illustration. Instead, the application of switches 128, 130, 132 will be discussed in greater detail below in connection with FIGS. 4-9. Multi-axis transducer 124 is similar to accelerometer 20 (FIG. 1). Hence, a number of elements remain the same and reference numerals remain unchanged. Accordingly, transducer 124 includes first and second proof masses 30, 32, first and second spring systems 34, 36, and electrodes 82, 84, 86, 88, 100, 102. A description of these elements and their function will not be repeated herein for brevity.

In accordance with a particular embodiment, transducer 124 includes a plurality of sense contacts in which a set of sense contacts is electrically coupled to the features of first proof mass 30 and another set of sense contacts is electrically coupled to the features of second proof mass 32.

In the illustrated configuration, electrodes 82 associated with first proof mass 30 are electrically coupled to a sense contact 184, labeled "A" and is referred to herein as "A" sense contact 184. Likewise, electrodes 84 associated with first proof mass 30 are electrically coupled to a sense contact 186, labeled "B" and is referred to herein as "B" sense contact 186. Electrodes 86 associated with first proof mass 30 are electrically coupled to a sense contact 188, labeled "C" and is referred to herein as "C" sense contact 188. Electrodes 88 associated with first proof mass 30 are electrically coupled to a sense contact 190, labeled "D" and is referred to herein as "D" sense contact 190. Additionally, electrode 100 associated with first proof mass 30 is electrically coupled to a sense contact 192, labeled "Z+" and is referred to herein as "Z+" sense contact 192. Electrode 102 associated with first proof mass 30 is electrically coupled to a sense contact 194, labeled "Z−" and is referred to herein as "Z−" sense contact 194. Still further, a sense contact 196 is electrically coupled to first proof mass 30, labeled "M1" and is referred to herein as "M1" sense contact 196.

Additionally, electrodes 82 associated with second proof mass 32 are electrically coupled to a sense contact 198, labeled "A" and is referred to herein as "A" sense contact 198. Likewise, electrodes 84 associated with second proof mass 32 are electrically coupled to a sense contact 200, labeled "B" and is referred to herein as "B" sense contact 200. Electrodes 86 associated with second proof mass 32 are electrically coupled to a sense contact 202, labeled "C" and is referred to herein as "C" sense contact 202. Electrodes 88 associated with second proof mass 32 are electrically coupled to a sense contact 204, labeled "D" and is referred to herein as "D" sense contact 204. Additionally, electrode 100 associated with second proof mass 32 is electrically coupled to a sense contact 206, labeled "Z+" and is referred to herein as "Z+" sense contact 206. Electrode 102 associated with second proof mass 32 is electrically coupled to a sense contact 208, labeled "Z−" and is referred to herein as "Z−" sense contact 208. Still further, a sense contact 210 is electrically coupled to second proof mass 32, labeled "M2" and is referred to herein as "M2" sense contact 210.

Regarding first proof mass 30, A sense contact 184 is configured to provide an output signal 212, B sense contact 186 is configured to provide an output signal 214, C sense contact 188 is configured to provide an output signal 216, and D sense contact 190 is configured to provide an output signal 218. Output signals 212, 214, 216, and 218 correspond to physical displacement of first proof mass 30 resulting from Y-axis acceleration force 51 in Y-direction 52 and/or X-axis acceleration force 65 in X-direction 66. Z+ sense contact 192 is configured to provide an output signal 220 and Z− sense contact 194 is configured to provide an output signal 222. Output signals 220, 222 correspond to physical displacement of first proof mass 30 resulting from Z-axis acceleration force 72 in Z-direction 74.

Regarding second proof mass 32, A sense contact 198 is configured to provide an output signal 224, B sense contact 200 is configured to provide an output signal 226, C sense contact 202 is configured to provide an output signal 228, and D sense contact 204 is configured to provide an output signal 230. Output signals 224, 226, 228, and 230 correspond to physical displacement of second proof mass 32 resulting from Y-axis acceleration force 51 in Y-direction 52 and/or X-axis acceleration force 65 in X-direction 66. Z+ sense contact 206 is configured to provide an output signal 232 and Z− sense contact 208 is configured to provide an output signal 234. Output signals 232, 234 correspond to physical displacement of second proof mass 32 resulting from Z-axis acceleration force 72 in Z-direction 74.

Switch system 126 is in communication with sense contacts 184, 186, 188, 190, 192, 194 associated with first proof mass 30 and with sense contacts 198, 200, 202, 204, 206, 208 associated with second proof mass 32. Switch system 126 controls signaling from the various sense contacts of first and second proof masses 30, 32 in order to enable a sense mode and test modes for MEMS sensor 122. In the sense mode, the output signals from corresponding electrodes 82, 84, 86, 88, 100, 102 associated with both of first and second proof masses 30, 32 are electrically coupled with one another to form a sense signal. In a test mode, the output signals are electrically decoupled from one another to disassociate the output signals from one another.

Thus, a switch 236 suitably controls output signal 212 provided from A sense contact 184 associated with first proof mass 30 and output signal 224 provided from A sense contact 198 associated with second proof mass 32. Switch 236 will be referred to herein as Switch A 236. Similarly, a switch 238 suitably controls output signal 214 provided from B sense contact 186 associated with first proof mass 30 and output signal 226 provided from B sense contact 1200 associated with second proof mass 32. Switch 238 will be referred to herein as Switch B 238. A switch 240 suitably controls output signal 216 provided from C sense contact 188 associated with first proof mass 30 and output signal 228 provided from C sense contact 202 associated with second proof mass 32. Switch 240 will be referred to herein as Switch C 240. A switch 242 suitably controls output signal 218 provided from D sense contact 190 associated with first proof mass 30 and output signal 230 provided from D sense contact 204 associated with second proof mass 32. Switch 242 will be referred to herein as Switch D 242.

A switch 244 suitably controls output signal 220 provided from Z+ sense contact 192 associated with first proof mass 30 and output signal 232 provided from Z+ sense contact 206 associated with second proof mass 32. Switch 244 will be referred to herein as Switch Z+ 244. A switch 246 suitably controls output signal 222 provided from Z− sense contact 194 associated with first proof mass 30 and output signal 234 provided from Z− sense contact 208 associated with second proof mass 32. Switch 246 will be referred to herein as Switch Z− 246.

As mentioned briefly above, switch system 126 is configured to enable a sense mode and a test mode for MEMS sensor 122. By way of example, a sense mode of operation entails the selective closure of switches 236, 238, 240, 242, 244, 246. Accordingly, when Switch A 236 is closed, output signals 212 and 224 are added or otherwise combined to produce and output an "A" sense capacitance 248, labeled $C_{2A}$, where the subscript "2" indicates that A sense capacitance 248 is a summation of both output signals 212 and 224. Likewise, when Switch B 238 is closed, output signals 214 and 226 are added or otherwise combined to produce and output a "B" sense capacitance 250, labeled $C_{2B}$. When Switch C 240 is closed, output signals 216 and 228 are added or otherwise combined to produce and output a "C" sense capacitance 252, labeled $C_{2C}$. When Switch D 242 is closed, output signals 218 and 230 are added or otherwise combined to produce and output a "D" sense capacitance 254, labeled $C_{2D}$. When Switch Z+244 is closed, output signals 220 and 232 are added or otherwise combined to produce and output a "Z+" sense capacitance 256, labeled $C_{2Z+}$. And, when Switch Z− 246 is closed, output signals 222 and 234 are added or otherwise combined to produce and output a "Z−" sense capacitance 258, labeled $C_{2Z-}$.

In accordance with the dual proof mass configuration of MEMS sensor 122, and output signal indicative of a magnitude of Y-axis acceleration force 51, as follows:

$$A_Y = (C_{2A} + C_{2C}) - (C_{2B} + C_{2D}) \quad (4)$$

For X-axis acceleration force 65 ($A_X$), an output signal indicative of a magnitude of X-axis acceleration force 65, as follows:

$$A_X = (C_{2A} + C_{2D}) - (C_{2B} + C_{2C}) \quad (5)$$

For Z-axis acceleration force 72 ($A_Z$), an output signal indicative of a magnitude of Z-axis acceleration force 72, as follows:

$$A_Z = (C_{2Z+} - C_{2Z-}) \quad (3)$$

Equations (4), (5), and (6) are generally a reiteration of equations (1), (2), and (3), respectively. However, in equations (4), (5), and (6) the subscript "2" is particularly included to emphasize the effective increase in magnitude of the output signals due to the dual proof mass configuration.

A test mode of operation entails the selective opening of switches 236, 238, 240, 242, 244, 246. Accordingly, when Switch A 236 is opened, output signal 212 is disassociated from output signal 224 so that each of output signals 212 and 224 are output separately from Switch A 236. In this illustration, output signal 212 is a test capacitance, labeled $C_{(M1)A}$, from A sense contact 184 for first proof mass 30 and output signal 224 is a test capacitance, labeled $C_{(M2)A}$, from A sense contact 198 for second proof mass 32 that are output separately from Switch A 236. Similarly, when Switch B 238 is open, output signal 214, labeled $C_{(M1)B}$, from B sense contact 186 for first proof mass 30 and output signal 226, labeled $C_{(M2)B}$, from B sense contact 200 for second proof mass 32 are output separately from Switch B 238. When Switch C 240 is open, output signal 216, labeled $C_{(M1)C}$, from C sense contact 188 for first proof mass 30 and output signal 228, labeled $C_{(M2)C}$, from C sense contact 202 for second proof mass 32 are output separately from Switch C 240. When Switch D 242 is open, output signal 218, labeled $C_{(M1)D}$, from D sense contact 190 for first proof mass 30 and output signal 230, labeled $C_{(M2)D}$, from D sense contact 204 for second proof mass 32 are output separately from Switch D 242. When Switch Z+244 is open, output signal 220, labeled $C_{(M1)Z+}$, from Z+ sense contact 192 for first proof mass 30 and output signal 232, labeled $C_{(M2)Z+}$, from Z+ sense contact 206 for second proof mass 32 are output separately from Switch Z+244. And, when Switch Z− 246 is open, output signal 222, labeled $C_{(M1)Z-}$, from Z− sense contact 194 for first proof mass 30 and output signal 234, labeled $C_{(M2)Z-}$, from Z− sense contact 208 for second proof mass 32 are output separately from Switch Z− 246.

In an embodiment, Switch A 236 may be controlled by a control input 260, labeled $S_A$. Switch B 238 may be controlled by a control input 262, labeled $S_B$. Switch C 240 may be controlled by a control input 264, labeled $S_C$. Switch D 254 may be controlled by a control input 266, labeled $S_D$. Switch Z+256 may be controlled by a control input 268, labeled $S_{Z+}$. And, Switch Z− 246 may be controlled by a control input 270, labeled $S_{Z-}$. The control input may either be a logic "1" for closing the associated switch or a logic "0" for opening the associated switch.

It should be observed in FIG. 3 that a node at each of switches 236, 238, 240, 242, 244, 224 for their respective sense capacitances 248, 250, 252, 254, 256, 258 has an outwardly directed single-ended arrow extending from it. The single-ended arrow symbolizes that each of these nodes will only output a signal (e.g., one of sense capacitances 248, 250, 252, 254, 256, 258) as MEMS sensor 122 experiences an acceleration force in a particular axis. Conversely, two additional nodes at each of switches 236, 238, 240, 242, 244, 224 for their respective output signals 212/224, 214/226, 216/228, 218/230, 220/232, 222/234 has a bi-directional arrow extending from them. The bi-directional arrow symbolizes that each of these nodes can be used to excite (thereby causing physical displacement of) proof masses 30, 32 via the electrically coupled electrodes 82, 84, 86, 88, 100, 102 and to sense output signals 212/224, 214/226, 216/228, 218/230, 220/232, 222/234 resulting from the physical displacement of proof masses 30, 32.

Figure 4:
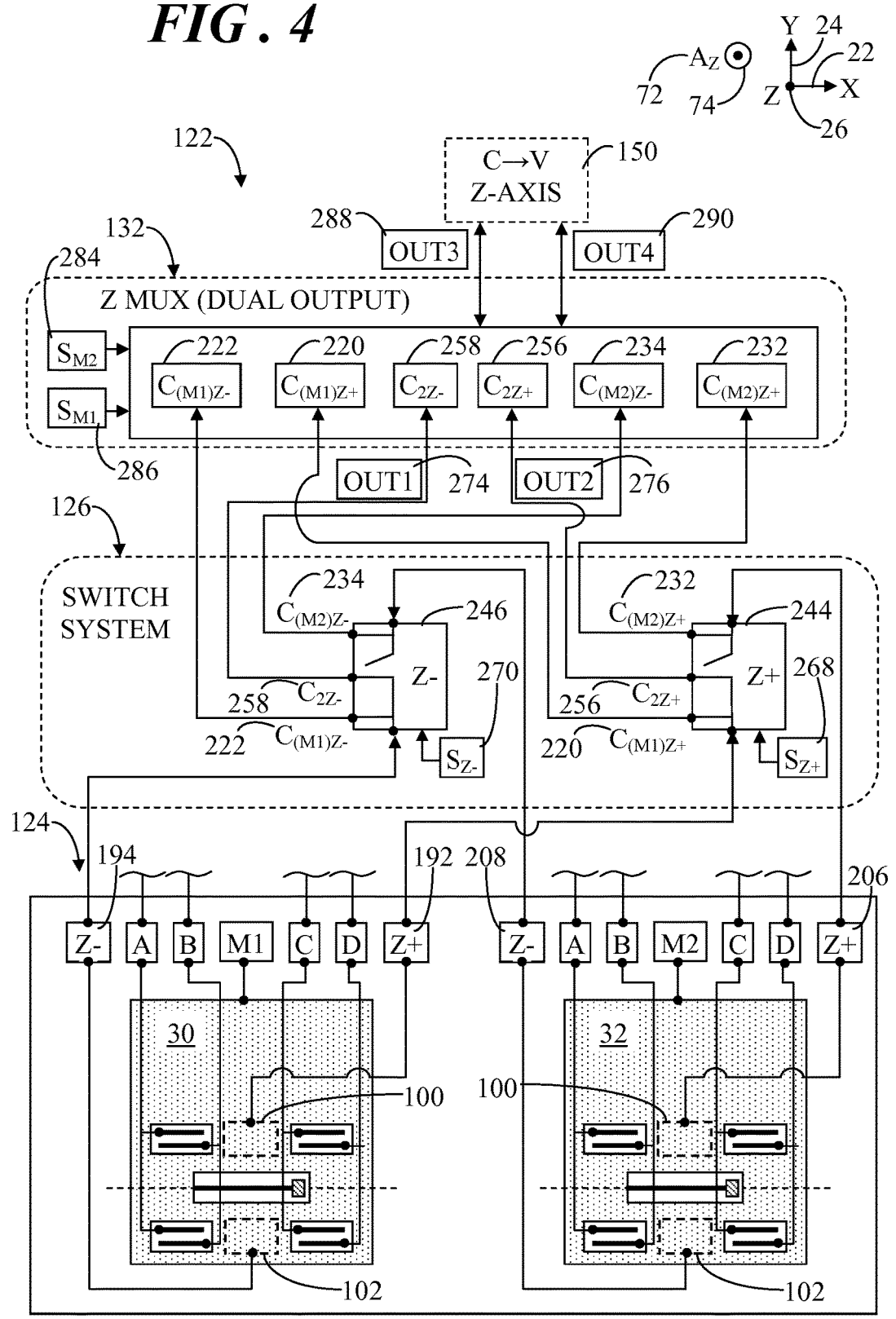
FIG. 4 depicts in a simplified and representative form a block diagram of a portion of MEMS sensor presented in FIG. 3.

Referring now to FIGS. 4 and 5, FIG. 4 depicts in a simplified and representative form a block diagram of a portion of MEMS sensor 122, and FIG. 5 shows a table 272 of switch logic settings corresponding to the block diagram of FIG. 4. FIGS. 4 and 5 are provided to illustrate the selective operation of MEMS sensor 122 in a sense mode or in a test mode. More particularly, FIGS. 4 and 5 demonstrate the enablement of a sense mode for sensing Z-axis acceleration force 72 and the enablement of a test mode in order to determine trim values 178 (FIG. 2) specific to sensing in Z-axis 26 for each of first and second proof masses 30, 32. Accordingly, only those features pertinent to the sense and test modes for Z− axis 26 are labeled in FIG. 4 for clarity.

In this example, Z− sense contact 194 for first proof mass 30 and Z− sense contact 208 for second proof mass 32 are electrically coupled to Switch Z− 246. At Switch Z− 246, Z− sense capacitance 258 (which is a combination of Z− output signal 222 and Z− output signal 234) or Z− output signal 222 and Z− output signal 234 disassociated from one another will be output from Switch Z− 246 depending upon a logic state of control input 270. As shown in table 272, when control input 270 is a logic state "1," a switch output 274 (labeled OUT1 in FIGS. 4 and 5) of Switch Z− 246 is Z− sense capacitance 258. Thus, Z− sense capacitance 258 is communicated to Z-axis dual output multiplexer switch 132. Likewise, Z+ sense contact 192 for first proof mass 30 and Z+ sense contact 206 for second proof mass 32 are electrically coupled to Switch Z+ 244. At Switch Z+ 244, Z+ sense capacitance 232 (which is a combination of Z+ output signal 220 and Z+ output signal 232) or Z+ output signal 220 and Z+ output signal 232 disassociated from one another will be output from Switch Z+ 244 depending upon a logic state of control input 268. As shown in table 272, when control input 268 is a logic state "1," a switch output 276 (labeled OUT2 in FIGS. 4 and 5) of Switch Z+ 244 is Z+ sense capacitance 256. Thus, Z+ sense capacitance 256 is communicated to Z-axis dual output multiplexer switch 132. Accordingly, a logic state of "1" at each of control inputs 268 and 270 enables a Z-axis sense mode 278 and the output of Z− sense capacitance 258 and Z+ sense capacitance 256 to Z-axis dual output multiplexer switch 132.

Conversely, a logic state of "0" at each of control inputs 268 and 270 initiates one of two test modes. These test modes include a first test mode associated with first proof mass 30 in Z-axis 26, i.e., a Z-axis M1 test mode 280, and a second test mode associated with second proof mass 32 in Z-axis 26, i.e., a Z-axis M2 test mode 282. When control inputs 268 and 270 are set to a logic state of "0," all of the output signals from Switch Z− 246 and Switch Z+244 are communicated separately and disassociated from one another to Z-axis dual output multiplexer switch 132. Thus, "Z−" output signal 222, "Z+" output signal 220, "Z−" output signal 234, and "Z+" output signal 232 are communicated to Z-axis dual output multiplexer switch 132.

At Z-axis dual output multiplexer switch 132, additional control inputs 284, 286 are may be implemented to determine which signals should be output via Z-axis dual output multiplexer switch 132 to Z-axis C-to-V 150. That is, logic states of control inputs 284, 286 may be suitably set in order to determine that Z− sense capacitance 258 and Z+ sense capacitance 256 should be output from multiplexer outputs 288, 290 (labeled OUT3 and OUT 4 respectively in FIGS. 4 and 5) of Z-axis dual output multiplexer switch 132 when in Z-axis sense mode 278. Alternatively, the logic states of control inputs 284, 286 may be suitably set in order to determine that Z− output signal 222 and Z+ output signal 220 should be output from multiplexer outputs 288, 290 when in Z-axis M1 test mode 280 or that Z− output signal 234 and Z+ output signal 232 should be output from multiplexer outputs 288, 290 when in Z− axis M2 test mode 282.

In an example, table 272 reveals that when both of control inputs 284, 286 are set to logic state "1," MEMS sensor 122 is in Z-axis sense mode 278 so that Z− sense capacitance 258 and Z+ sense capacitance 256 will be output from multiplexer outputs 288, 290. When control input 284 is set to logic state "0" and control input 286 is set to logic state "1," MEMS sensor 122 is in Z-axis M1 test mode 280 so that Z− output signal 222 and Z+ output signal 220 will be output from multiplexer outputs 288, 290. When control input 284 is set to logic state "1" and control input 286 is set to logic state "0," MEMS sensor 122 is in Z-axis M2 test mode 282 so that Z− output signal 234 and Z+ output signal 232 will be output from multiplexer outputs 288, 290.

The enablement of sense and test modes, and the commensurate setting of the logic states of control inputs 268, 270, 284, 286, can be suitably controlled through the execution of calibration algorithm 168 (FIG. 2) by calibration control unit 166 (FIG. 2). Although a dual output multiplexer switch is described herein, those skilled in the art will recognize that other switching configurations may be envisioned for suitably switching between Z-axis sense mode 278, Z-axis M1 test mode 280, and Z-axis M2 test mode 282.

Figure 6:
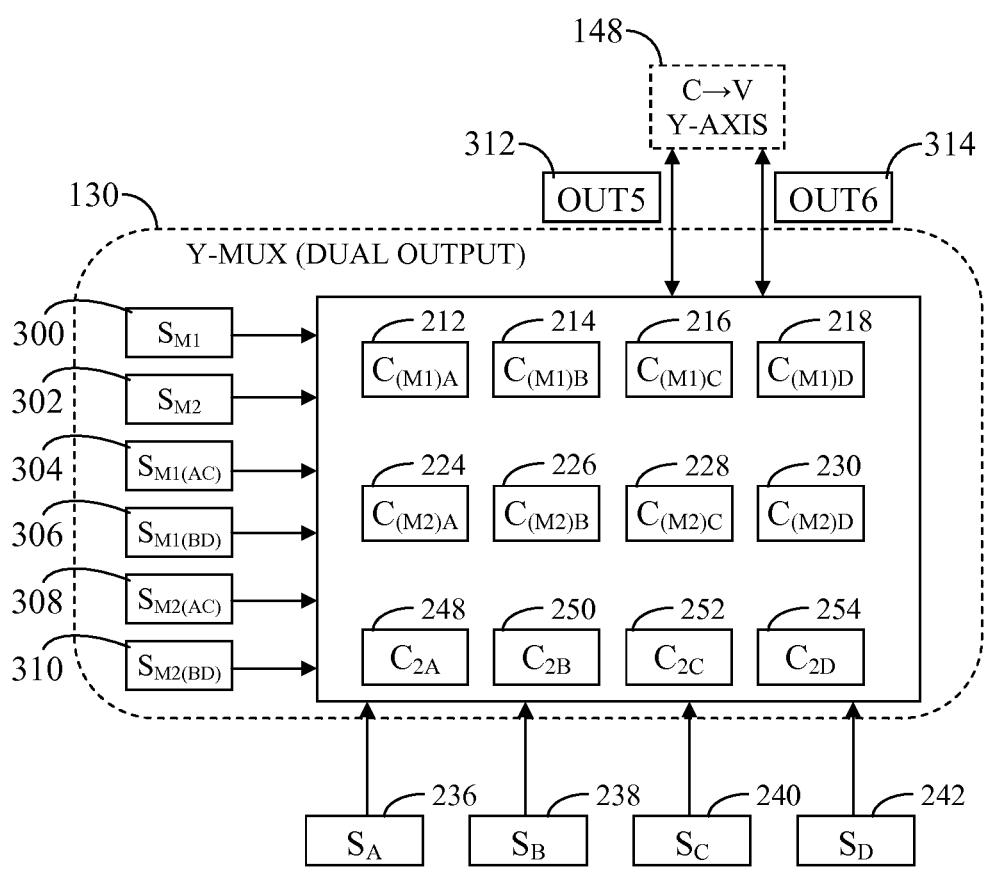
FIG. 6 shows in a simplified and representative form a block diagram of a Y-axis dual output multiplexer switch of the system of FIG. 2.

FIG. 6 shows in a highly simplified and representative form a block diagram of Y-axis dual output multiplexer switch 130 of system 120 (FIG. 2). As discussed extensively above, the provision of A output signal 212, B output signal 214, C output signal 216, D output signal 218 associated with first proof mass 30 (FIG. 2), the provision of A output signal 224, B output signal 226, C output signal 228, D output signal 230 associated with second proof mass 32 (FIG. 2), and the provision of A sense capacitance 248, B sense capacitance 250, C sense capacitance 252, and D sense capacitance 254 are governed by Switch A 236, Switch B 238, Switch C 240, and Switch D 242.

Through the execution of calibration algorithm 168 by calibration control unit 166, the logic states (1 or 0) of control inputs 300, 302, 304, 306, 308, and 310 can be set to produce a multiplexer output 312, labeled OUT5, and a multiplexer output 314, labeled OUT6. Multiplexer outputs 312, 314 can then be communicated to Y-axis C-to-V 148 for further processing. The various logic states of control inputs 300, 302, 304, 306, 308, and 310 for enabling sense and various test modes and the various multiplexer outputs 312, 314 will be described in connection with FIGS. 8 and 9.

Figure 7:
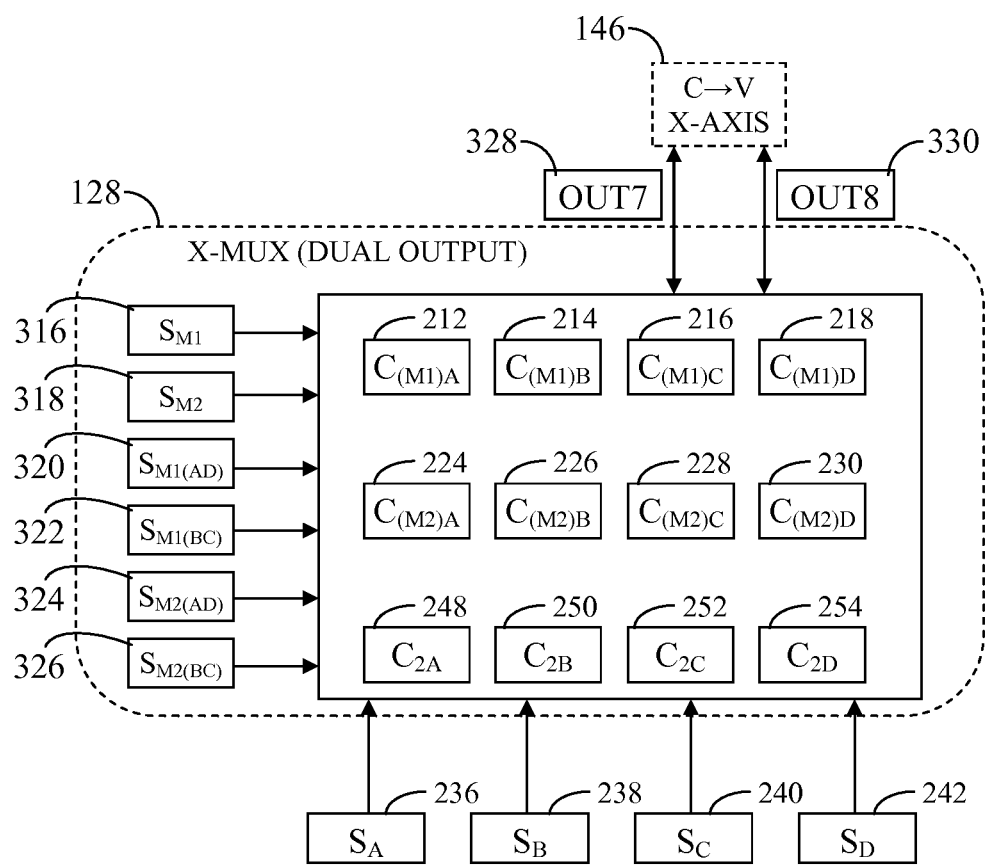
FIG. 7 shows in a simplified and representative form a block diagram of an X-axis dual output multiplexer switch of the system of FIG. 2.

FIG. 7 shows in a highly simplified and representative form a block diagram of X-axis dual output multiplexer switch 128 of system 120 (FIG. 2). As discussed extensively above, the provision of A output signal 212, B output signal 214, C output signal 216, D output signal 218 associated with first proof mass 30 (FIG. 2), the provision of A output signal 224, B output signal 226, C output signal 228, D output signal 230 associated with second proof mass 32 (FIG. 2), and the provision of A sense capacitance 248, B sense capacitance 250, C sense capacitance 252, and D sense capacitance 254 are governed by Switch A 236, Switch B 238, Switch C 240, and Switch D 242.

Through the execution of calibration algorithm 168 by calibration control unit 166, the logic states (1 or 0) of control inputs 316, 318, 320, 322, 324, and 326 can be set to produce a multiplexer output 328, labeled OUT7, and a multiplexer output 330, labeled OUT8. Multiplexer outputs 328, 330 can then be communicated to X-axis C-to-V 146 for further processing. The various logic states of control inputs 316, 318, 320, 322, 324, and 326 for enabling sense and various test modes and the various multiplexer outputs 328, 330 will be described in connection with FIGS. 8 and 9.

Referring now to FIGS. 6-8, FIG. 8 shows at table 332 of switch logic settings corresponding to the block diagrams of FIGS. 6 and 7 for enabling sense and test modes of operation of MEMS sensor 122. A first column of table 332, referred to herein as mode type 334, specifies the various sense and test modes of operation that may be enabled by setting the logic states of Switches A, B, C, and D of switch system 126, as well as be setting the logic states of control inputs 300, 302, 304, 306, 308, 310 (of Y-axis dual output multiplexer switch 130) and control inputs 316, 318, 320, 322, 324, and 326 (of X-axis dual output multiplexer switch 128).

As shown in FIG. 8, a Y-axis/X-axis sense mode 336 is enabled when the logic state of each of Switches A, B, C, and D of switch system 126 is set to "1" and the logic state of each of control inputs 300, 302, 304, 306, 308, 310, 316, 318, 320, 322, 324, and 326 is set to "0."

A Y-axis M1 test mode 338 is enabled when the logic state of each of Switches A, B, C, and D of switch system 126 is set to "0," the logic state of each of control inputs 300, 304, 306 are set to "1," and the logic state of each of control inputs 302, 308, 310, 316, 318, 320, 322, 324, and 326 is set to "0." That is, control input 300 selects first proof mass 30 (FIG. 2), i.e., M1, control input 304 enables the summation of A output signal 212 and C output signal 216, and control input 306 enables the summation of B output signal 214 and D output signal 218 associated with first proof mass 30.

A Y-axis M2 test mode 340 is enabled when the logic state of each of Switches A, B, C, and D of switch system 126 is set to "0," the logic state of each of control inputs 302, 308, 310 are set to "1," and the logic state of each of control inputs 300, 304, 306, 316, 318, 320, 322, 324, and 326 is set to "0." That is, control input 302 selects second proof mass 32, i.e., M2, control input 308 enables the summation of A output signal 224 and C output signal 228, and control input 310 enables the summation of B output signal 226 and D output signal 230 associated with second proof mass 32.

An X-axis M1 test mode 342 is enabled when the logic state of each of Switches A, B, C, and D of switch system 126 is set to "0," the logic state of each of control inputs 316, 320, 322 are set to "1," and the logic state of each of control inputs 300, 302, 304, 306, 308, 310, 318, 324, and 326 is set to "0." That is, control input 316 selects first proof mass 30, i.e., M1, control input 320 enables the summation of A output signal 212 and D output signal 218, and control input 322 enables the summation of B output signal 214 and C output signal 216 associated with first proof mass 30.

An X-axis M2 test mode 344 is enabled when the logic state of each of Switches A, B, C, and D of switch system 126 is set to "0," the logic state of each of control inputs 318, 324, 326 are set to "1," and the logic state of each of control inputs 300, 302, 304, 306, 308, 310, 316, 320, and 322 is set to "0." That is, control input 318 selects second proof mass 32, i.e., M2, control input 324 enables the summation of A output signal 224 and D output signal 230, and control input 326 enables the summation of B output signal 226 and C output signal 228 associated with second proof mass 32.

A Y-axis M1/X-axis M2 test mode 346 is enabled when the logic state of each of Switches A, B, C, and D of switch system 126 is set to "0," the logic state of each of control inputs 300, 304, 306, 318, 324, 326 are set to "1," and the logic state of each of control inputs 302, 308, 310, 316, 320, and 322 is set to "0." That is, control input 300 selects first proof mass 30, i.e., M1, control input 304 enables the summation of A output signal 212 and C output signal 216, and control input 306 enables the summation of B output signal 214 and D output signal 218 associated with first proof mass 30. Additionally, control input 318 selects second proof mass 32, i.e., M2, control input 324 enables the summation of A output signal 224 and D output signal 230, and control input 326 enables the summation of B output signal 226 and C output signal 228 associated with second proof mass 32.

A Y-axis M2/X-axis M1 test mode 348 is enabled when the logic state of each of Switches A, B, C, and D of switch system 126 is set to "0," the logic state of each of control inputs 302, 308, 310, 316, 320, 322 are set to "1," and the logic state of each of control inputs 300, 304, 306, 318, 324, and 326 is set to "0." That is, control input 302 selects second proof mass 32, i.e., M2, control input 308 enables the summation of A output signal 224 and C output signal 228, and control input 310 enables the summation of B output signal 226 and D output signal 230 associated with first proof mass 30. Additionally, control input 316 selects first proof mass 30, i.e., M1, control input 320 enables the summation of A output signal 212 and D output signal 218, and control input 322 enables the summation of B output signal 214 and C output signal 216 associated with first proof mass 30.

In general, first and second proof masses 30, 32 can be excited separately in any of the test modes utilizing stimulus signals 140, 142 (FIG. 2) applied to the appropriate sense contacts 184, 186, 188, 190, 192, 194, 198, 200, 202, 204, 206, 208 (FIG. 3) in order to cause physical displacement of first and second proof masses 30, 32. That is, the same sense contacts are used to both excite and read the data (i.e., output signals). By way of example, a fifty/fifty duty cycle may be imposed (i.e., 50% of the time a stimulus signal is applied to cause physical displacement of one of proof masses 30, 32 and 50% of the time the resulting output signal is read). The collected output signals can thereafter be used to set trim values, as will be discussed in connection with FIG. 10.

Referring now to FIG. 9, FIG. 9 shows a table 350 of exemplary outputs in accordance with the sense and test modes of operation. A first column of table 250 specifies mode type 334, corresponding to the multiple mode types of FIG. 8. Thus, Y-axis/X-axis sense mode 336 presented in table 350 reveals that a summation of A sense capacitance 248 and C sense capacitance 252 will be output from multiplexer output 312 (OUT5) and a summation of B sense capacitance 250 and D sense capacitance 254 will be output from multiplexer output 314 (OUT6) as Y-axis output signals 136 (FIG. 2). These sense capacitances can be suitably processed to produce Y-axis voltage output signal 172 (FIG. 2). Additionally in Y-axis/X-axis sense mode 336, a summation of A sense capacitance 248 and D sense capacitance 254 will be output from multiplexer output 328 (OUT7) and a summation of B sense capacitance 250 and C sense capacitance 252 will be output from multiplexer output 330 as X-axis output signals 134 (FIG. 2). These sense capacitances can be suitably processed to produce X-axis voltage output signal 174 (FIG. 2).

In Y-axis test mode 338, a summation of A output signal 212 and C output signal 216 for first proof mass 30 (M1) will be output from multiplexer output 312 and a summation of B output signal 214 and D output signal 218 for first proof mass 30 will be output from multiplexer output 314. Note that there will not be signals output from multiplexer outputs 328, 330 in Y-axis test mode 338. Output signals 212, 214, 216, 218 are produced when a stimulus signal (e.g., 140, 142 of FIG. 2) is applied to the related sense contacts as discussed above. In an embodiment, the stimulus signal may first be applied to A and C sense contacts 184, 188 (FIG. 3) for the first half of the duty cycle. Then the stimulus signal may be applied to B and D sense contacts 186, 190 (FIG. 3) for the second half of the duty cycle. The applied stimulus signal is configured to cause physical displacement of first proof mass 30 to simulate Y-axis acceleration 51 in Y-direction 52 (FIG. 2). These output signals can be suitably processed to produce Y-axis voltage output signal 174 (FIG. 2). However, Y-axis voltage output signal 174 can now be used to determine trim values pertaining to Y-axis sensing by first proof mass 30.

In Y-axis test mode 340, a summation of A output signal 224 and C output signal 228 for second proof mass 32 (M2) will be output from multiplexer output 312 and a summation of B output signal 226 and D output signal 230 for second proof mass 32 will be output from multiplexer output 314. Again, note that there will not be signals output from multiplexer outputs 328, 330 in Y-axis test mode 340. Output signals 224, 226, 228, 230 are produced when a stimulus signal (e.g., 140, 142 of FIG. 2) is applied to the related sense contacts as discussed above. The applied stimulus signal is configured to cause physical displacement of second proof mass 32 to simulate Y-axis acceleration 51 in Y-direction 52 (FIG. 2). These output signals can be suitably processed to produce Y-axis voltage output signal 174 (FIG. 2). However, Y-axis voltage output signal 174 can now be used to determine trim values pertaining to Y-axis sensing by second proof mass 32.

In X-axis test mode 342, a summation of A output signal 212 and D output signal 218 for first proof mass 30 (M1) will be output from multiplexer output 328 and a summation of B output signal 214 and D output signal 216 for first proof mass 30 will be output from multiplexer output 330. There will not be signals output from multiplexer outputs 312, 314 in X-axis test mode 342. Output signals 212, 214, 216, 218 are produced when a stimulus signal (e.g., 140, 142 of FIG. 2) is applied to the related sense contacts as discussed above. The applied stimulus signal is configured to cause physical displacement of first proof mass 30 to simulate X-axis acceleration 65 in X-direction 66 (FIG. 2). These output signals can be suitably processed to produce X-axis voltage output signal 172 (FIG. 2). However, X-axis voltage output signal 172 can now be used to determine trim values pertaining to X-axis sensing by first proof mass 30.

In X-axis test mode 344, a summation of A output signal 224 and D output signal 230 for second proof mass 32 (M2) will be output from multiplexer output 328 and a summation of B output signal 226 and C output signal 228 for second proof mass 32 will be output from multiplexer output 330. There will not be signals output from multiplexer outputs 312, 314 in X-axis test mode 344. Output signals 224, 226, 228, 230 are produced when a stimulus signal (e.g., 140, 142 of FIG. 2) is applied to the related sense contacts as discussed above. The applied stimulus signal is configured to cause physical displacement of second proof mass 32 to simulate X-axis acceleration 65 in X-direction 66 (FIG. 2). These output signals can be suitably processed to produce X-axis voltage output signal 172 (FIG. 2). However, X-axis output voltage signal 172 can now be used to determine trim values pertaining to X-axis sensing by second proof mass 32.

Any of Y-axis test mode 338, Y-axis test mode 340, X-axis test mode 342 and X-axis test mode 344 which only causes physical displacement of one of proof masses 30, 32 may be performed concurrent with Z-axis test mode 280 or Z-axis test mode 328 to cause physical displacement of the other one of proof masses 30, 32.

In Y-axis M1/X-axis M2 test mode 346, a summation of A output signal 212 and C output signal 216 for first proof mass 30 (M1) will be output from multiplexer output 312 and a summation of B output signal 214 and D output signal 218 for first proof mass 30 will be output from multiplexer output 314. Additionally, a summation of A output signal 224 and D output signal 230 for second proof mass 32 (M2) will be output from multiplexer output 328 and a summation of B output signal 226 and C output signal 228 for second proof mass 32 will be output from multiplexer output 330. In this example, a stimulus signal applied to first proof mass 30 is configured to cause physical displacement of first proof mass 30 to simulate Y-axis acceleration 51 in Y-direction 52 (FIG. 2). Furthermore, a stimulus signal applied to second proof mass 32 is configured to cause physical displacement of second proof mass 32 to simulate X-axis acceleration 65 in X-direction 66 (FIG. 2). The various output signals can be suitably processed to produce Y-axis voltage output signal 174 that can be used to determine trim values pertaining to Y-axis sensing by first proof mass 30 and to produce X-axis voltage output signal 172 that can be used to determine trim values pertaining to X-axis sensing by second proof mass 32.

In Y-axis M2/X-axis M1 test mode 348, a summation of A output signal 224 and C output signal 228 for second proof mass 32 (M2) will be output from multiplexer output 312 and a summation of B output signal 226 and D output signal 230 for second proof mass 32 will be output from multiplexer output 314. Additionally, a summation of A output signal 212 and D output signal 218 for first proof mass 30 (M1) will be output from multiplexer output 328 and a summation of B output signal 214 and C output signal 216 for first proof mass 30 will be output from multiplexer output 330. In this example, a stimulus signal applied to second proof mass 32 is configured to cause physical displacement of second proof mass 30 to simulate Y-axis acceleration 51 in Y-direction 52 (FIG. 2). Furthermore, a stimulus signal applied to first proof mass 30 is configured to cause physical displacement of first proof mass 30 to simulate X-axis acceleration 65 in X-direction 66 (FIG. 2). The various output signals can be suitably processed to produce Y-axis voltage output signal 174 that can be used to determine trim values pertaining to Y-axis sensing by second proof mass 32 and to produce X-axis voltage output signal 172 that can be used to determine trim values pertaining to X-axis sensing by first proof mass 30.

Figure 10:
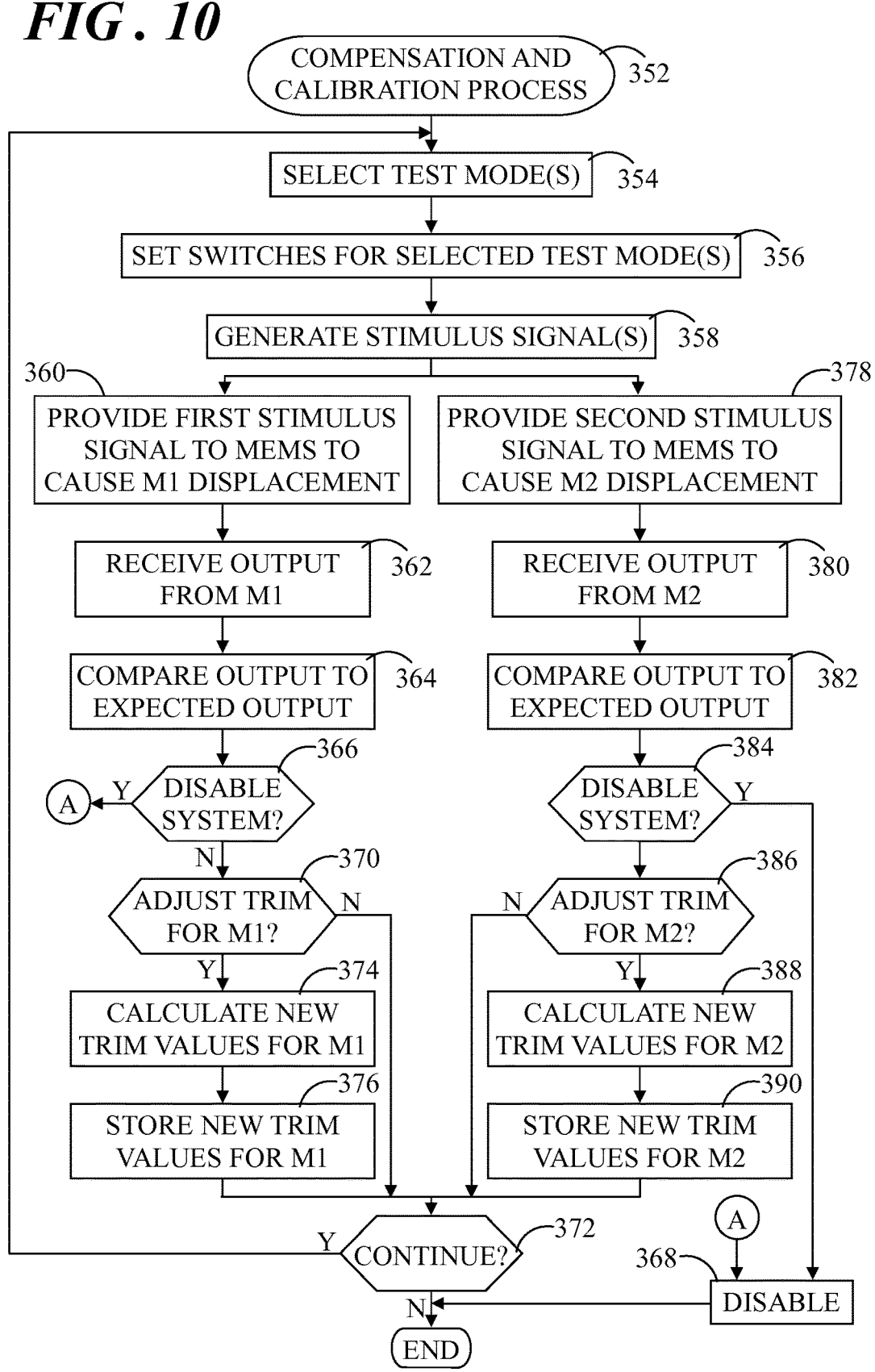
FIG. 10 shows a flowchart of a calibration and compensation process implemented within the system of FIG. 2.

FIG. 10 shows a flowchart of a calibration and compensation process 352 implemented within the system of FIG. 2. In an embodiment, process 352 is implemented by the execution of calibration algorithm 168 (FIG. 2) at test and calibration block 164. In a operation 354, test modes for the concurrent testing of first and second proof masses 30, 32 are selected. At an operation 356, the switches are set for the selected test modes. The test modes and logic states of various input controls (i.e., switch settings) are described in detail above in connection with FIGS. 4-9 and will not be repeated herein for brevity.

At an operation 358, stimulus signals, e.g., first and second stimulus signals 140, 142 (FIG. 2) are generated. First and second stimulus signals 140, 142 may be a suitably defined and configured pseudorandom signal pattern. Subsequent operations are performed to calculate trim values pertaining to a particular sense axis for first proof mass 30 and to concurrently calculate trim values pertaining to a particular sense axis for second proof mass 32.

Thus at an operation 360, first stimulus signal 140 is provided to MEMS sensor 122 (FIG. 2) to cause physical displacement of first proof mass 30. At an operation 362, an output signal corresponding to the physical displacement of first proof mass 30 is provided from the suitably configured sense contacts and is received at test and calibration block 164. At an operation 364, calibration control unit 166 compares the output signal from MEMS sensor 122 related to the physical displacement of first proof mass 30 with an expected output of MEMS sensor 122 related to the physical displacement of first proof mass 30.

At an operation 366, calibration control unit 166 makes a determination, based on the results of the comparison operation 364 as to whether or not MEMS sensor 122 and/or system 120 (FIG. 2) are to be disabled. If MEM sensor 122 and/or system 120 are to be disabled, they are disabled in an operation 368. However, if MEMS sensor 122 and/or system 120 are not to be disabled, processing continues with an operation 370. At operation 370, calibration control unit 166 makes a determination, based on the result of the comparison operation 364, as to whether or not trim values need to be adjusted for the particular axis being tested for first proof mass 30 of MEMS sensor 122. If new trim values are not needed, processing proceeds to a continue query operation 372 to determine whether further calibration and compensation is to be performed. If new trim values are needed, processing continues with an operation 374, in which new trim values are calculated using the output signals provided by MEMS sensor 122. Thereafter, the new trim values pertaining specifically to first proof mass 30 of MEMS sensor 122 can be stored in register 160 (FIG. 2) of trim block 158 (FIG. 2) at an operation 376.

As mentioned previously, trim values may be calculated concurrently for a particular sense axis of second proof mass 32. Thus at an operation 378 (occurring approximately simultaneously with operation 360), second stimulus signal 142 is provided to MEMS sensor 122 (FIG. 2) to cause physical displacement of second proof mass 32. Second stimulus signal 142 can be different from or identical to first stimulus signal 141. At an operation 380, an output signal corresponding to the physical displacement of second proof mass 32 is provided from the suitably configured sense contacts and is received at test and calibration block 164. At an operation 382, calibration control unit 166 compares the output signal from MEMS sensor 122 related to the physical displacement of second proof mass 32 with an expected output of MEMS sensor 122 related to the physical displacement of second proof mass 32.

At an operation 384, calibration control unit 166 makes a determination, based on the results of the comparison operation 382 as to whether or not MEMS sensor 122 and/or system 120 (FIG. 2) are to be disabled. If MEM sensor 122 and/or system 120 are to be disabled, they are disabled in operation 368. However, if MEMS sensor 122 and/or system 120 are not to be disabled, processing continues with an operation 386. At operation 386, calibration control unit 166 makes a determination, based on the result of the comparison operation 382, as to whether or not trim values need to be adjusted for the particular axis being tested for second proof mass 32 of MEMS sensor 122. If new trim values are not needed, processing proceeds to continue query operation 372 to determine whether further calibration and compensation is to be performed. If new trim values are needed, processing continues with an operation 388, in which new trim values are calculated using the output signals provided by MEMS sensor 122. Thereafter, the new trim values pertaining specifically to second proof mass 32 of MEMS sensor 122 can be stored in register 160 (FIG. 2) of trim block 158 (FIG. 2) at an operation 390.

Following a negative response to either of query operations 370 or 386, or following execution of operations 376 and 390, continue query operation 372 is executed to determine whether the other sense axes are to be tested to determine whether new trim values are needed. When further testing is to be performed, processes control loops back to operation 354 to select additional test modes. However, when further testing is not needed compensation and calibration process 352 ends. Thus, MEMS sensor 122 can be suitably controlled so as to be switched to Y-axis/X-axis sense mode 336 (FIG. 9) and Z-axis sense mode 278 (FIG. 5).

Figure 11:
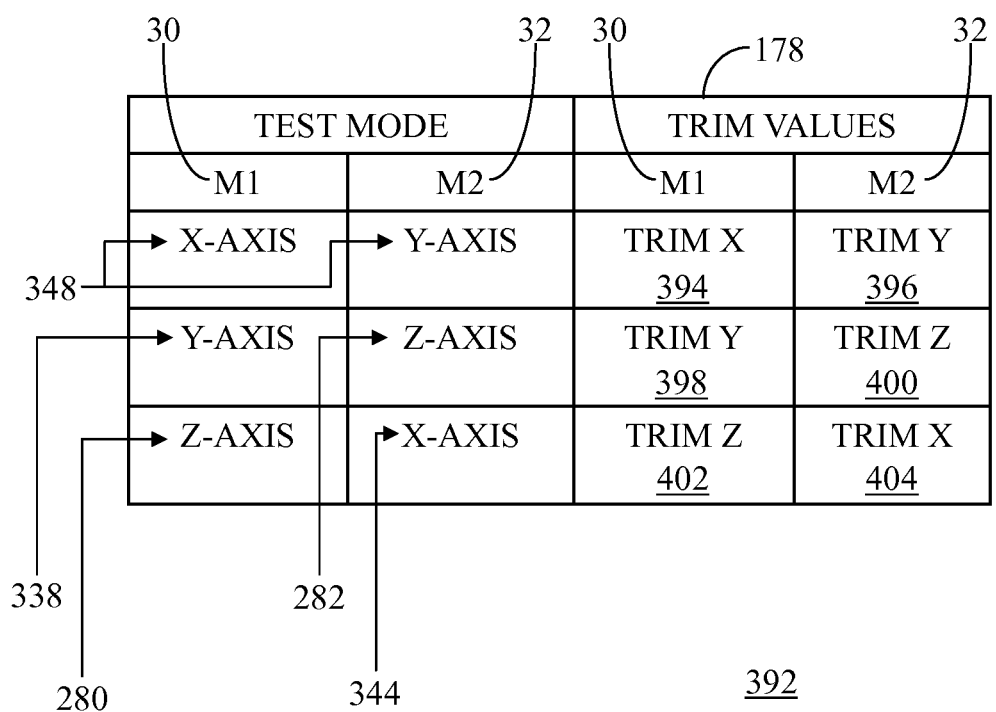
FIG. 11 shows a table of exemplary test modes and trim values resulting from the execution of the calibration and compensation process of FIG. 10.

Referring now to FIGS. 3, 10 and 11, FIG. 11 shows a table 392 of exemplary test modes and trim values resulting from the execution of the calibration and compensation process 352. During a first iteration of process 352, Y-axis M2/X-axis M1 test mode 348 may be selected at operation 354. As such, first stimulus signal 140 can cause physical displacement of first proof mass 30 to simulate X-axis acceleration force 65 and second stimulus signal 142 can cause physical displacement of second proof mass 32 to simulate Y-axis acceleration force 51. Thus, first proof mass 30 will pivot about pivot axis 68 (FIG. 1) and second proof mass 32 will translate in Y-direction 52. Accordingly, the movement of each of first and second proof masses 30, 32 differs from one another. During this first iteration of process 352, an X-axis trim value 394 can be calculated at operation 374 for first proof mass 30 and a Y-axis trim value 396 can be calculated at operation 388 for second proof mass 32.

At a next iteration of process 352, Y-axis M1 test mode 338 and Z-axis M2 test mode are selected at operation 354. As such, first stimulus signal 140 can cause physical displacement of first proof mass 30 to simulate Y-axis acceleration force 52 and second stimulus signal 142 can cause physical displacement of second proof mass 32 to simulate Z-axis acceleration force 72. Thus, first proof mass 30 will translate in Y-direction 52 and second proof mass 32 will undergo teeter totter, out-of-plane motion about rotational axis 46. During this next iteration of process 352, a Y-axis trim value 398 can be calculated at operation 374 for first proof mass 30 and a Z-axis trim value 400 can be calculated at operation 388 for second proof mass 32.

At yet another iteration of process 352, Z-axis M1 test mode 280 and X-axis M2 test mode 344 are selected at operation 354. As such, first stimulus signal 140 can cause physical displacement of first proof mass 30 to simulate Z-axis acceleration force 72 and second stimulus signal 142 can cause physical displacement of second proof mass 32 to simulate X-axis acceleration force 65. Thus, first proof mass 30 will undergo teeter totter, out-of-plane motion translate in Z-direction 74 and second proof mass 32 will pivot about pivot axis 70 (FIG. 1). During this next iteration of process 352, a Z-axis trim value 402 can be calculated at operation 374 for first proof mass 30 and an X-axis trim value 404 can be calculated at operation 388 for second proof mass 32.

Each of trim values 394, 396, 398, 400, 402, 404 may subsequently be stored in register 160 (FIG. 2) of trim block 158 (FIG. 2) for use in compensating (for offset) and calibrating (for gain) MEMS sensor 122 during normal operations. Table 392 exemplifies three iterations of compensation and calibration process 352 in order to concurrently obtain the trim values for both proof masses 30, 32 and for each of the three sense axes. It should be understood that various test modes may be selected to obtain each of trim values 394, 396, 398, 400, 402, 404.

Embodiments described herein entail a system, a microelectromechanical systems (MEMS) sensor, and methodology for testing the MEMS sensor within the system without the need for applying actual mechanical stimuli. An embodiment of a system comprises a MEMS sensor having a first movable element and a second movable element suspended from a substrate. A first sense contact is configured to provide a first output signal corresponding to physical displacement of the first movable element and a second sense contact is configured to provide a second output signal corresponding to the physical displacement of the second movable element. A switch system is in communication with the first and second sense contacts. The switch system is configured to enable a sense mode and a test mode of the MEMS sensor, wherein the first and second sense contacts are electrically coupled with one another to produce a sense signal as a combination of the first and second output signals when the switch system enables the sense mode, and the first and second sense contacts are electrically decoupled from one another to disassociate the first output signal from the second output signal when the switch system enables the test mode.

An embodiment of a MEMS sensor comprises a first movable element suspended from a substrate and a second movable element suspended from the substrate, the first and second movable elements being configured to move independent from one another in at least two orthogonal directions. A first sense contact is configured to provide a first output signal and a second sense contact is configured to provide a second output signal, the first and second output signals corresponding to the physical displacement of the first and second movable elements resulting from force imposed on the first and second movable elements in a first direction. A third sense contact is configured to provide a third output signal and a fourth sense contact is configured to provide a fourth output signal, the third and fourth output signals corresponding to the physical displacement of the first and second movable elements resulting from force imposed on the first and second movable elements in a second direction, the second direction being orthogonal to the first direction. A switch system is in communication with the first, second, third, and fourth sense contacts, the switch system being configured to enable a sense mode and a test mode of the MEMS sensor. When the switch system enables the sense mode, the first and second sense contacts are electrically coupled with one another to produce a first sense signal as a combination of the first and second output signals and the third and fourth sense contacts are electrically coupled with one another to produce a second sense signal as a combination of the third and fourth output signals. When the switch system enables the test mode, the first and second sense contacts are electrically decoupled from one another to disassociate the first output signal from the second output signal and the third and fourth sense contacts are electrically decoupled from one another to disassociate the third output signal from the fourth output signal.

An embodiment of a method of determining trim values for a MEMS sensor, the MEMS sensor having a first movable element and a second movable element suspended from a substrate, and the method comprising providing a first stimulus signal to the MEMS sensor to cause physical displacement of the first movable element and providing a second stimulus signal to the MEMS sensor to cause the physical displacement of the second movable element. The MEMS sensor further comprises detecting a first output signal corresponding to the physical displacement of the first movable element and detecting a second output signal corresponding to the physical displacement of the second movable element. The first output signal is evaluated to determine a first trim value specific to the first movable element and the second output value is evaluated to determine a second trim value specific to the second movable element.

Thus, calibration and compensation testing can be performed in real time and/or off line using single and multiple electrostatic stimuli on a MEMS sensor having multiple movable masses and multiple sense axes. Still further, efficient switching is enabled for switching between a test mode and a sense mode for the MEMS sensor system. The system and methodology enable the concurrent calibration of two axes of two independently movable elements (e.g., proof masses) of an inertial sensor in order to achieve the objectives of low-cost MEMS sensor testing, recalibration of MEMS sensors throughout the life of the MEMS sensors, and/or testing of MEMS sensor systems without removal of the MEMS sensors from the application.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
a microelectromechanical systems (MEMS) sensor having a first movable element and a second movable element suspended from a substrate;
a first sense contact configured to provide a first output signal corresponding to physical displacement of said first movable element;
a second sense contact configured to provide a second output signal corresponding to said physical displacement of said second movable element;
a switch system in communication with said first and second sense contacts, said switch system being configured to enable a sense mode and a test mode of said MEMS sensor, wherein said first and second sense contacts are electrically coupled with one another to produce a sense signal as a combination of said first and second output signals when said switch system enables said sense mode, and said first and second sense contacts are electrically decoupled from one another to disassociate said first output signal from said second output signal when said switch system enables said test mode; and
a control circuit configured to determine at first trim value associated with said first movable element in response to said first output signal and a second trim value associated with said second movable element in response to said second output signal.

2. The system of claim 1 wherein said first and second movable elements are configured to move independent from one another in response to force imposed upon said first and second movable elements.

3. The system of claim 1 wherein: said first and second movable elements are configured to move independent from one another in at least two orthogonal directions;
said first and second output signals correspond to said physical displacement of said first and second movable elements resulting from force imposed on said first and second movable elements in a first direction;
said sensor system further comprises: a third sense contact configured to provide a third output signal corresponding to said physical displacement of said first movable element resulting from a force imposed on said first movable element in a second direction, said second direction being orthogonal to said first direction; and
a fourth sense contact configured to provide a fourth output signal corresponding to said physical displacement of said second movable element resulting from force imposed on said second movable element in said second direction; and said switch system is in communication with said third and fourth sense contacts, wherein said third and fourth sense contacts are electrically coupled with one another to produce a second sense signal as a combination of said third and fourth output signals when said switch system enables said sense mode, and said third and fourth sense contacts are electrically decoupled from one another to disassociate said third output signal from said fourth output signal when said switch system enables said test mode.

4. A system comprising:

a microelectromechanical systems (MEMS) sensor having a first movable element and a second movable element suspended from a substrate;

a first sense contact configured to provide a first output signal corresponding to physical displacement of said first movable element;

a second sense contact configured to provide a second output signal corresponding to said physical displacement of said second movable element;

a switch system in communication with said first and second sense contacts, said switch system being configured to enable a sense mode and a test mode of said MEMS sensor, wherein said first and second sense contacts are electrically coupled with one another to produce a sense signal as a combination of said first and second output signals when said switch system enables said sense mode, and said first and second sense contacts are electrically decoupled from one another to disassociate said first output signal from said second output signal when said switch system enables said test mode; and a control circuit electrically coupled to said MEMS sensor, wherein:

when said switch system enables said test mode, said control circuit is configured to provide a first stimulus signal to said first sense contact, said first stimulus signal being configured to cause said physical displacement of said first movable element; and when said switch system enables said test mode, said control circuit is further configured to provide a second stimulus signal to said second sense contact, said second stimulus signal being configured to cause said physical displacement of said second movable element.

5. The system of claim 4 wherein:

said first stimulus signal is provided to said first movable element during a first interval;

said first output signal responsive to said physical displacement of said first movable element is detected during a second interval;

said second stimulus signal is provided to said second movable element during a third interval; and said second output signal responsive to said physical displacement of said second movable element is detected during a fourth interval.

6. The system of claim 5 wherein said first and third intervals occur concurrently and said second and fourth intervals occur concurrently.

7. A system comprising:

a microelectromechanical systems (MEMS) sensor having a first movable element and a second movable element suspended from a substrate;

a first sense contact configured to provide a first output signal corresponding to physical displacement of said first movable element;

a second sense contact configured to provide a second output signal corresponding to said physical displacement of said second movable element;

a switch system in communication with said first and second sense contacts, said switch system being configured to enable a sense mode and a test mode of said MEMS sensor, wherein said first and second sense contacts are electrically coupled with one another to produce a sense signal as a combination of said first and second output signals when said switch system enables said sense mode, and said first and second sense contacts are electrically decoupled from one another to disassociate said first output signal from said second output signal when said switch system enables said test mode;

wherein:

said first and second movable elements are configured to move independent from one another in at least two orthogonal directions;

said first and second output signals correspond to said physical displacement of said first and second movable elements resulting from force imposed on said first and second movable elements in a first direction;

said sensor system further comprises:

a third sense contact configured to provide a third output signal corresponding to said physical displacement of said first movable element resulting from a force imposed on said first movable element in a second direction, said second direction being orthogonal to said first direction; and a fourth sense contact configured to provide a fourth output signal corresponding to said physical displacement of said second movable element resulting from force imposed on said second movable element in said second direction;

said switch system is in communication with said third and fourth sense contacts, wherein said third and fourth sense contacts are electrically coupled with one another to produce a second sense signal as a combination of said third and fourth output signals when said switch system enables said sense mode, and said third and fourth sense contacts are electrically decoupled from one another to disassociate said third output signal from said fourth output signal when said switch system enables said test mode; and a control circuit electrically coupled to said MEMS sensor, wherein:

when said switch system enables said test mode, said control circuit is configured to provide a first stimulus signal to said first sense contact, said first stimulus signal being configured to cause said physical displacement of said first movable element, said first stimulus signal simulating a first force imposed on said first movable element in said first direction; and when said switch system enables said test mode, said control circuit is further configured to provide a second stimulus signal to said third sense contact, said second stimulus signal being configured to cause said physical displacement of said second movable element, said second stimulus signal simulating a second force imposed on said second movable element in said second direction.

8. The MEMS system of claim 7 wherein said physical displacement of said first movable element differs from said physical displacement of said second movable element.

9. The MEMS system of claim 7 wherein:
- said first stimulus signal is provided to said first sense contact and said second stimulus signal is provided to said third contact during a first interval; and
- said first output signal responsive to said physical displacement of said first movable element is provided at said first sense contact and a third output signal responsive to said physical displacement of said second movable element is provided at said third sense contact during a second interval, said second interval following said first interval.

* * * * *